United States Patent
Swartz et al.

(10) Patent No.: US 7,040,541 B2
(45) Date of Patent: May 9, 2006

(54) PORTABLE SHOPPING AND ORDER FULFILLMENT SYSTEM

(75) Inventors: Jerome Swartz, Old Field, NY (US);
Thomas K. Roslak, Eastport, NY (US);
Judith Murrah, St. James, NY (US);
Robert Beach, Los Altos, CA (US);
John Klein, Morgan Hill, CA (US);
Mauro Premutico, Brooklyn, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 269 days.

(21) Appl. No.: 09/487,923

(22) Filed: Jan. 19, 2000

(65) Prior Publication Data

US 2002/0050526 A1 May 2, 2002

Related U.S. Application Data

(60) Division of application No. 08/866,690, filed on May 30, 1997, which is a continuation-in-part of application No. 08/780,023, filed on Dec. 20, 1996, now Pat. No. 6,084,528, which is a continuation-in-part of application No. 08/706,579, filed on Sep. 5, 1996, now Pat. No. 5,825,002.

(51) Int. Cl.
*G06K 7/10* (2006.01)

(52) U.S. Cl. ............... 235/472.02; 235/462.46
(58) Field of Classification Search ........... 235/376, 235/378, 383, 385, 462.45, 462.46, 472.01, 235/472.02
See application file for complete search history.

(56) References Cited

U.S. PATENT DOCUMENTS

| | | | |
|---|---|---|---|
| 4,373,133 A | 2/1983 | Clyne et al. | 235/383 |
| 4,628,193 A | 12/1986 | Blum | 235/375 |
| 4,771,840 A * | 9/1988 | Keller | 180/11 |
| 4,779,706 A | 10/1988 | Mergenthaler | 186/61 |
| 4,787,467 A | 11/1988 | Johnson | 177/50 |
| 4,792,018 A | 12/1988 | Humble et al. | 186/61 |
| 4,833,308 A | 5/1989 | Humble | 235/383 |
| 4,882,724 A | 11/1989 | Vela et al. | 364/401 |
| 4,947,028 A | 8/1990 | Gorog | 235/381 |
| 4,949,256 A | 8/1990 | Humble | 364/401 |
| 4,973,952 A | 11/1990 | Malec et al. | 340/825 |
| 5,047,614 A | 9/1991 | Bianco | 235/385 |
| 5,186,281 A | 2/1993 | Jenkins | 186/55 |

(Continued)

FOREIGN PATENT DOCUMENTS

| | | |
|---|---|---|
| EP | 619662 A2 | 3/1994 |
| EP | 697793 A2 | 2/1996 |
| EP | 744856 A2 | 11/1996 |
| JP | 04255037 * | 4/1994 |
| JP | 410069007 * | 3/1998 |
| JP | 02002207805 * | 7/2004 |
| NL | 9002296 | 10/1990 |
| WO | WO90/16033 | 12/1990 |

*Primary Examiner*—Daniel Stcyr
(74) *Attorney, Agent, or Firm*—Amin & Turocy, LLP

(57) ABSTRACT

The present invention relates to an improved order fulfillment system. The system is provided with improved data entry system for selecting items for purchase by a customer, and an improved item collection terminal and order delivery system. The portable terminal to be used for collecting of items is provided with an audio as well as video presentation means which are used to provide assistance to the to terminal user.

7 Claims, 19 Drawing Sheets

U.S. PATENT DOCUMENTS

| | | | |
|---|---|---|---|
| 5,192,854 A | 3/1993 | Counts | 235/375 |
| 5,227,874 A | 7/1993 | Von Kohorn | 358/84 |
| 5,250,789 A * | 10/1993 | Johnsen | 235/383 |
| 5,264,822 A * | 11/1993 | Vogelman et al. | 340/286.01 |
| 5,287,266 A | 2/1994 | Malec et al. | 364/401 |
| 5,294,781 A | 3/1994 | Takahashi et al. | 235/376 |
| 5,297,882 A | 3/1994 | Kornides | 401/184 |
| 5,310,997 A | 5/1994 | Roach et al. | 235/375 |
| 5,334,821 A | 8/1994 | Campo et al. | 235/380 |
| 5,340,970 A | 8/1994 | Wolfe et al. | 235/383 |
| 5,345,071 A | 9/1994 | Dumont | 235/383 |
| 5,361,871 A * | 11/1994 | Gupta et al. | 186/61 |
| 5,397,882 A | 3/1995 | Van Solt | 235/381 |
| 5,418,354 A * | 5/1995 | Halling et al. | 235/383 |
| 5,420,606 A | 5/1995 | Begum et al. | 345/156 |
| 5,424,524 A | 6/1995 | Ruppert et al. | 235/462 |
| 5,426,282 A | 6/1995 | Humble | 235/383 |
| 5,428,546 A * | 6/1995 | Shah et al. | 364/449 |
| 5,434,394 A | 7/1995 | Roach et al. | 235/375 |
| 5,437,346 A | 8/1995 | Dumont | 186/61 |
| 5,448,471 A | 9/1995 | Deaton et al. | 364/401 |
| 5,457,307 A | 10/1995 | Dumont | 235/383 |
| 5,463,209 A | 10/1995 | Figh et al. | 235/383 |
| 5,468,942 A | 11/1995 | Oosterveen et al. | 235/383 |
| 5,469,206 A | 11/1995 | Strubbe et al. | 348/7 |
| 5,478,989 A | 12/1995 | Shepley | 235/375 |
| 5,490,060 A | 2/1996 | Malec et al. | 364/401 |
| 5,510,606 A * | 4/1996 | Worthington et al. | 235/472.01 |
| 5,540,301 A * | 7/1996 | Dumont | 186/61 |
| 5,557,088 A | 9/1996 | Shimizu et al. | 235/383 |
| 5,630,068 A | 5/1997 | Vela et al. | 395/201 |
| 5,640,002 A * | 6/1997 | Ruppert et al. | 235/472 |
| 5,664,110 A | 9/1997 | Green et al. | 705/26 |
| 5,677,834 A * | 10/1997 | Mooneyham | 364/188 |
| 5,729,697 A * | 3/1998 | Schkolnick et al. | 395/223 |
| 5,761,648 A | 6/1998 | Golden et al. | 705/14 |
| 5,808,894 A * | 9/1998 | Wiens et al. | 700/231 |
| 5,821,513 A * | 10/1998 | O'Haga et al. | 235/383 |
| 5,828,322 A * | 10/1998 | Eberhard | 340/988 |
| 5,845,263 A * | 12/1998 | Camaisa et al. | 705/27 |
| 5,859,414 A | 1/1999 | Grimes et al. | 235/383 |
| 5,859,628 A * | 1/1999 | Ross et al. | 345/173 |
| 5,890,135 A * | 3/1999 | Powell | 705/14 |
| 5,899,285 A * | 5/1999 | Curbelo | 180/65.1 |
| 5,918,211 A | 6/1999 | Sloane | 705/16 |
| 5,950,173 A | 9/1999 | Perkowski | 705/26 |
| 5,964,601 A * | 10/1999 | Tsurumaru et al. | 439/141 |
| 5,970,469 A | 10/1999 | Scroggie et al. | 705/14 |
| 5,984,182 A * | 11/1999 | Murrah et al. | 235/383 |
| 5,995,015 A | 11/1999 | DeTemple et al. | 340/825.49 |
| 6,000,610 A | 12/1999 | Talbott et al. | 235/383 |
| 6,009,411 A | 12/1999 | Kepecs | 705/14 |
| 6,010,064 A * | 1/2000 | Umeda et al. | 235/375 |
| 6,014,634 A | 1/2000 | Scroggie et al. | 705/14 |
| 6,024,281 A * | 2/2000 | Shepley | 235/375 |
| 6,026,376 A | 2/2000 | Kenney | 705/27 |
| 6,035,191 A * | 3/2000 | Moore | 455/418 |
| 6,055,573 A | 4/2000 | Gardenswartz et al. | 709/224 |
| 6,076,069 A | 6/2000 | Laor | 705/14 |
| 6,101,483 A | 8/2000 | Petrovich et al. | 705/26 |
| 6,101,485 A | 8/2000 | Fortenberry et al. | 705/27 |
| 6,119,935 A | 9/2000 | Jelen et al. | 235/383 |
| 6,123,259 A * | 9/2000 | Ogasawara | 235/380 |
| 6,129,274 A | 10/2000 | Suzuki | 235/381 |
| 6,129,276 A * | 10/2000 | Jelen et al. | 235/383 |
| 6,138,914 A * | 10/2000 | Campo et al. | 235/472.01 |
| 6,155,486 A | 12/2000 | Lutz | 235/383 |
| 6,168,079 B1 | 1/2001 | Becker et al. | 235/383 |
| 6,185,541 B1 | 2/2001 | Scroggie et al. | 705/14 |
| 6,189,789 B1 | 2/2001 | Levine et al. | 235/383 |
| 6,237,145 B1 | 5/2001 | Narasimhan et al. | 725/23 |
| 6,296,184 B1 | 10/2001 | Dejaeger | 235/383 |
| 6,298,330 B1 | 10/2001 | Gardenswartz et al. | 705/14 |
| 6,317,722 B1 | 11/2001 | Jacobi et al. | 705/14 |
| 6,330,543 B1 | 12/2001 | Kepecs | 705/14 |
| 6,405,049 B1 * | 6/2002 | Herrod et al. | 455/517 |

\* cited by examiner

PORTABLE SHOPPING AND ORDER FULFILLMENT SYSTEM

RELATED APPLICATIONS

This application is a divisional application of pending U.S. application Ser. No. 08/866,690, filed May 30, 1997, which is a continuation-in-part of U.S. patent application Ser. No. 08/780,023 entitled "INTRANET SCANNING TERMINAL SYSTEM" filed on Dec. 20, 1996, and now U.S. Pat. No. 6,084,528 granted on Jul. 4, 2000, which is a continuation-in-part of U.S. application Ser. No. 08/706,579 entitled "DEVICE AND METHOD FOR SECURE DATA UPDATES IN A SELF-CHEKOUT SYSTEM" filed on Sep. 5, 1996, and now U.S. Pat. No. 5,825,002 granted on Oct. 20,1998.

FIELD OF USE

This application relates generally to an improved system for ordering, collecting and distributing selected goods using an improved data communication system. More specifically, this invention relates to an improved shopping having order entry, collection and retrieval subsystems which may be as a portable shopping unit within a store or as part of an improved home shopping and order fulfillment system.

BACKGROUND OF THE INVENTION

Hand-held computer terminals have been previously used in consumer portable shopping applications. Examples of such systems are described in Dutch Patent Application No. 9002296 ("the '296 Application") and U.S. Pat. No. 5,468,942 to Oosterveen et al. ("the Oosterveen Patent"). The '296 Application and the Oosterveen Patent describe systems in which an authorized customer is issued a terminal having an integrated bar code scanner to record merchandise purchases. After items are scanned with the bar code scanners, the terminals maintain a record of merchandise selected for purchase by the customer within internal memory means. Prior to exiting the store, the information stored in the memory of a scanner is downloaded through a communication port attached to a terminal dispenser, and a printed ticket of the customer's purchases is printed on a printer. The customer then proceeds to a checkout register where the customer tenders payment for the purchased merchandise. The systems may provide for the occasional audit of customers using the system to ensure integrity of the self-service system.

Commercially available prior art self-checkout systems have generally employed relatively simple and unsophisticated portable computing technologies which have generally been limited to providing simple pricing and product itemization information. Although the proliferation and general acceptance of networked computers and the Internet has improved access to information, it has not yet changed the fundamental nature of how consumers select, purchase and receive consumable goods and other items, nor has such information been successfully provided to consumers during a standard shopping transaction at a retail facility. Nor have these systems been employed to significantly improve article collection and distribution systems. There currently exists a need for improved ordering systems, systems for providing improved product data profiles, order collection and order fulfillment.

SUMMARY OF THE INVENTION

It is the object of the present invention to provide an improved portable terminal and data communication system which may be used in a portable shopping and order fulfillment system.

It is a further object of the present invention to provide a standardized system for presenting data at a portable terminal by retrieving associated data files stored at remote addresses by employing a wireless communication network. In a preferred embodiment, the portable terminal employs a relatively simple microprocessor and system architecture while providing full graphics and audio support.

It is a further object of the present invention to provide improved access to generally available multi-media data files associated with an item identified by a portable terminal.

It is a further object of the present invention to provide an improved self-scanning system which provides improved multi-media support, access to product information and direct marketing functions.

It is a further object of the present invention to provide a home shopping system including a graphical data selection system for ordering items and creating shopping lists, and an improved material collection system.

The present invention provides an improved portable shopping system and an improved order selection and fulfillment system. The portable shopping system is provided with an improved portable terminal which is provided with telephony as well as enhanced video capabilities. The home shopping system is provided with a customer order system, a product collection system and a product delivery system. In a preferred embodiment of the present invention, the order system is an Internet accessible user interface which is user dependent. An authorized user may access the system from their home computer (or dedicated order kiosk) and retrieve user specific data which may be useful in placing their order. For instance, a user may select a list of items purchased on his or her last three shopping trips to the store or for items required for a selected recipe. Alternatively, a user may employ a graphical display of a store product layout to browse through the store's products for selection of items. Once the items are selected, the customer may then select to have the list stored, items collected for pick-up or delivery.

When the items are to be collected, either by the customer or an attendant, the collector is provided with a portable hand-held terminal which displays the list of items to be collected. The terminal is in communication with a central host and may be provided with a machine code reader to assist in recording selected items from the list. The portable terminal is also provided with item-related information, as required, to assist in selecting items such as product ingredients, nutritional data, price information, and promotional data. In the event the terminal is used by an attendant, such functions may be turned off and items such as delivery instructions and packing requests may be provided. The system could also be employed to permit efficient collection of the listed items, or in the case of an attendant collecting items for order fulfillment for multiple customers, efficient collection and tracking of multiple customer orders.

In a preferred embodiment of the present invention, a portable terminal having an integrated machine code reader and a radio is provided with a graphical user interface such as a "web browser." The terminal is provided with a display for illustrating help and instructional files associated with a selected item identified with the machine code reader.

The information downloaded to the hand-held terminal can be presented in any number of forms. The data can be presented in the form of a still picture, text, audio or as video. The use of standard data protocols such as those used currently on the Internet permit wide area accessibility over commercial and closed communication networks on any number of hardware platforms.

A preferred alternative embodiment of the present invention includes machine readable coded labels having one or more remote file location, such as uniform resurrect locators ("URLS") used to reference sites on the world wide web. These URLs are used by the portable terminal to retrieve data files including items such as prices, nutritional data, coupon availability, promotions, marketing data and general interest data from various local and remote addresses available over a wireless communication network. The machine coded labels are preferably encoded with a high-density bar code such as PDF417. These URLs can be presented on the terminal display in the form of a hyperlink which submits a data retrieval request to a remote address upon selection. The displayed hyperlink could be presented on the display as either a direct address (URL) or a highlighted title for the address.

In an alternative embodiment of the present invention, a portable terminal having a unique address on the system is provided with a voice transmission channel. This permits the terminal to function as a telephone and pager. The telephone line could be automatically established using an associated data link or by dialing a phone number.

BRIEF DESCRIPTION OF THE DRAWINGS

The present invention will be understood and appreciated more fully from the following detailed description, taken in conjunction with the drawings, in which.

DETAILED DESCRIPTION OF THE PREFERRED EMBODIMENT

The present invention employs a portable terminal having an integrated machine code reader. Although the system will be described in terms of a portable terminal employing an integrated bar code laser scanner, it will be understood by those skilled in the art that the machine code reader can be a radio frequency identification tag reader, a CCD bar code reader having imaging capabilities for recording images or any other type of machine code reader which can decode encoded indicia on an article.

The portable terminal of the present invention employs a wireless communication radio for communicating data to a central computer over a wireless communication network. The network could be either a local area network ("LAN"), such as Symbol's SPECTRUM24 spread spectrum frequency hopping communication network, or a wide area communication network system ("WAN") such as those employing a cellular digital packet data (CDPD) communication protocol, or a combination of LAN and WAN systems.

Data collected with the portable terminal is communicated to a central host. In a preferred embodiment, the central host performs most of the computing functions, thereby reducing the computational memory and power requirements of the portable terminals communicating with the system. The central host is preferably connected to other remote networks through high speed communication links such as commercially available T1, T2 or T3 type telephone connections. Through such connections, the central host may communicate with third party servers employing standard TCP/IP and other standardized communication protocols to transmit/retrieve data.

The present invention will be described in terms of an improved portable shopping system in a retail facility. However, as noted above, it will be understood by those skilled in the art that the present invention may be utilized in any data collection environment in which data is communicated from a central host to an end user employing a portable data collection terminal.

A. The Portable Terminal

Figure 2:
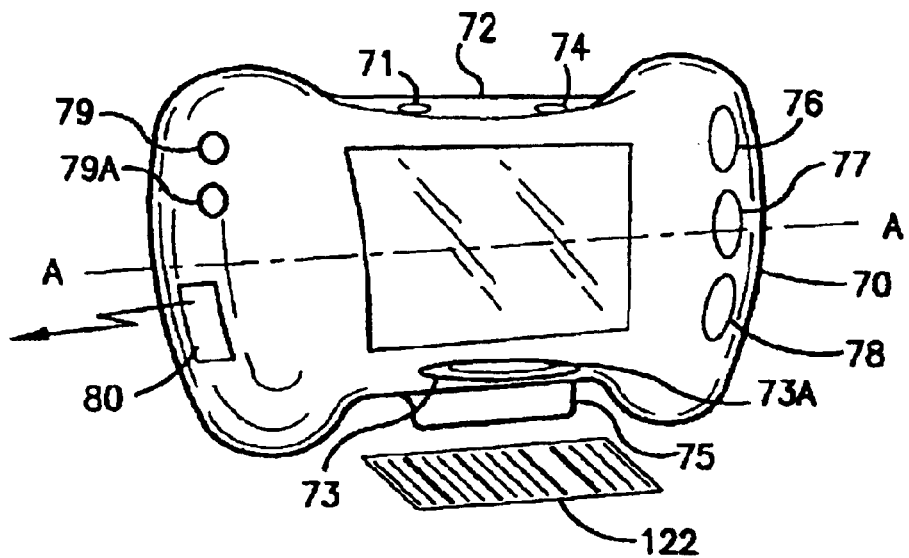
FIG. 2 is a preferred embodiment of a portable terminal of the present invention.

FIG. 2 illustrates a preferred embodiment of a portable terminal of the present invention. The terminal 70 is provided with a display 72. The display is preferably a CGA or VGA type video display having a touch sensitive surface. The display will function both as a video display and a data input device. A pen 73 is also provided on the terminal 70. The pen 73 is located in a pen slot 73A when not in use. The pen 73 could also be an auto identification bar code reading device.

In a preferred embodiment, the terminal 70 is also provided with a limited number of activation buttons 76, 77 and 78 for performing various user functions. In the context of a preferred portable shopping system, the portable terminal includes a "plus" key to "add" an item selected by a consumer to a list of purchased items, a "minus" key to "delist" a previously selected item from the purchase list which is to be returned to the shelves of the store, and an "equals" key to display the total cost of the items selected for purchase. The key functions can be defined on the screen of a touch sensitive scanner.

In a preferred embodiment of the present invention, the terminal 70 is provided with a voice communication system including a microphone 71 and a speaker 74. This voice communication system may be used to obtain assistance from a store operator or to transmit audio data broadcast by the central host, i.e., "Please proceed to the store checkout center, the store will close in ten minutes" or "Soda is on sale for 89 cents in aisle five." Video messages may also be transmitted to the video display 72. In order to protect consumers in retail facilities from unwanted commercial transmissions, the terminal is also provided with a commercial transmission "on/off" button 79. This button disables transmission of broadcast audio and/or video commercials to consumers during their shopping trips. Preferably, the "off" button will not disengage the transmission of urgent messages such as a lost child notice, an emergency notice, or as described further below, a specified preference information message. In addition, the voice system on the portable terminal may also be used to provide voice activated control commands on the portable terminal.

Collection of data is preferably performed by a bar code scanner 75. Preferably the scanner will be able to read one and two dimensional bar codes such as the ubiquitous UPC code and PDF 417 code. In an alternative embodiment of the present invention, the scanner is detachable from the terminal so that the terminal may be attached to a shopping cart with a shopping cart cradle and the scanner can be detached for use by the consumer. The scanner could be provided with either a short range radio link and its own battery supply or a wired connection. In the event the products selected by the customer also bear electronic article surveillance (EAS) tags, the terminal may also be provided with a deactivation circuit which is activated when the product is scanned for purchase and deactivation prior to the product being delisted from the consumer's shopping list. An example of such an activation/deactivating system is described in pending U.S. patent application No. 07/919,410 filed on Jul. 27, 1992 which is assigned to Symbol Technologies, Inc. The EAS tags are preferably used on a limited number of restricted sales items so that the EAS tags will be deactivated/activated only upon determination that the selected item is available for purchase by the customer at that specified time and place.

The portable terminal 70 communicates with a central host through a wireless radio 80. In a preferred embodiment of the present invention, the radio 80 is a Symbol SPECTRUM24 PCMCIA type II card communicating over a local area network employing a frequency-hopping communication system conforming to Draft D5 of IEEE proposed standard 802.11. The standard is available from IEEE Standards Department, 445 Hoes Lane, P.O. Box 1331, Piscataway, N.J. 08855-1331. The standard is incorporated herein by reference and shall not be further discussed. The system employs data throughput of at least one mega bit per second. Depending on the volume of data being transmitted, discrete communication systems such as SPECTRUM ONE, also available from Symbol Technologies, Inc., may also be used. Moreover, many other frequency bands and data encoding schemes could be employed which provide adequate bandwidth and security.

The ergonomic design of the portable terminal shown in FIG. 2 permits a consumer to use the terminal in either horizontal configuration along line A—A, or in a vertical configuration relative to line A—A. The terminal is provided with a reconfiguration key setting which permits the video system to automatically reconfigure its display to reflect the user's preference. The reconfiguration key 79A will automatically reconfigure the video display to change the display configuration from the first configuration, e.g., landscape, to a second configuration, e.g., portrait. The reconfiguration function permits a facility to connect the portable terminal to a fixed station in more than one arrangement. Thus, depending on space requirements, the portable terminal may be used as part of a kiosk or to provide a fixed station for presenting pricing data, advertising and customer assistance.

Figure 3:
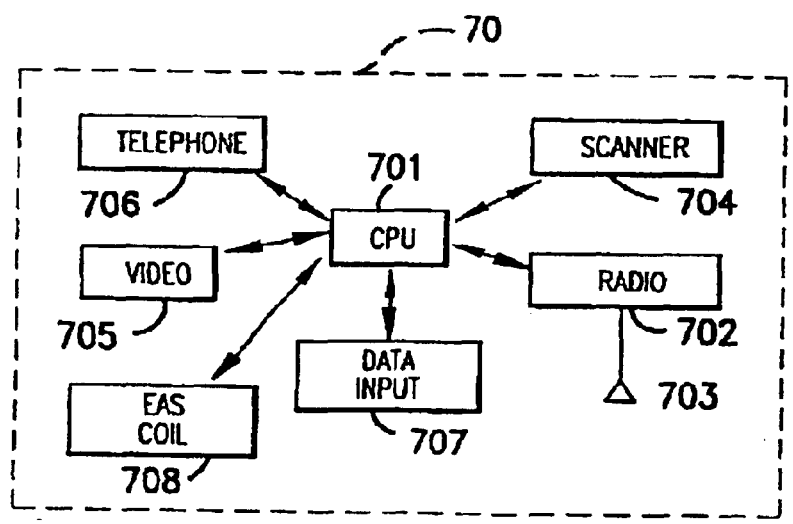
FIG. 3 is a functional block diagram of the basic subcomponents of a preferred embodiment of a portable terminal of the present invention.

FIG. 3 illustrates the basic subcomponent systems of the portable terminal shown in FIG. 2. As shown, the system 70 includes a CPU 701 which communicates with the radio 702, scanning subsystem 704, the video subsystem 705, the telephone subsystem 706, data input device 707, and an EAS tag activation/deactivation circuit 708.

Figure 4:
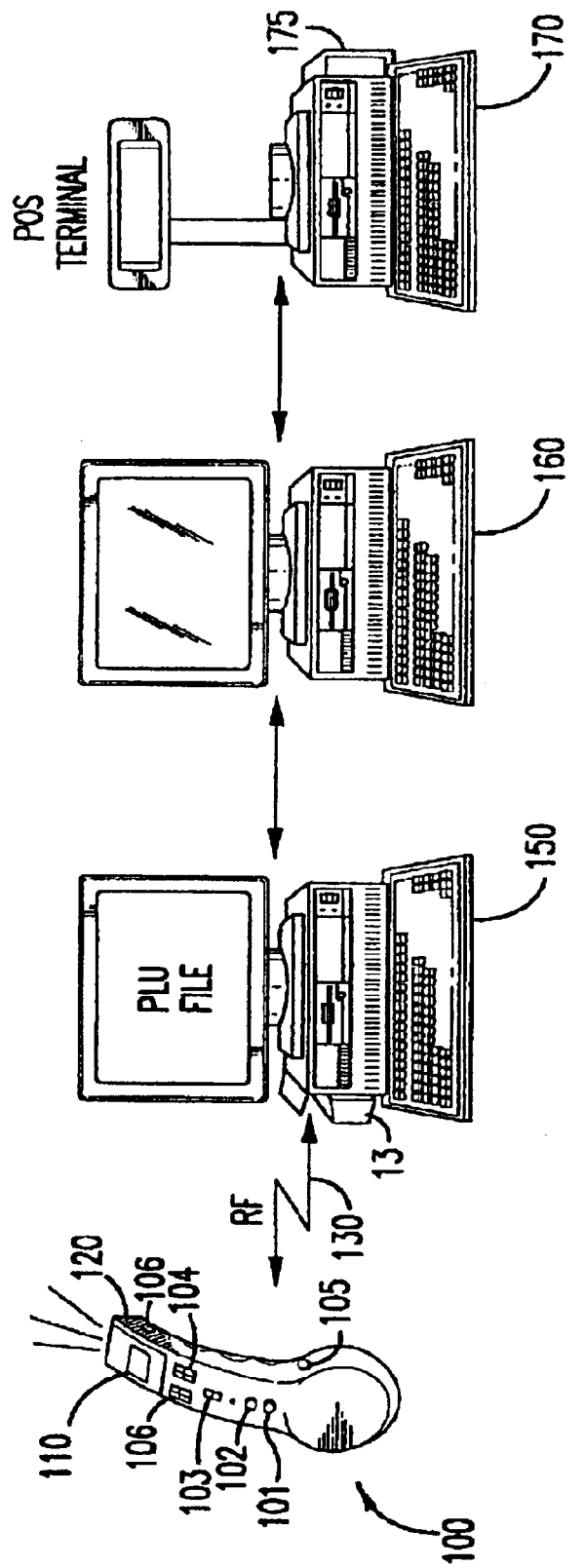
FIG. 4 is an alternative preferred embodiment of the present invention used in a self-scanning application.
Figure 5:
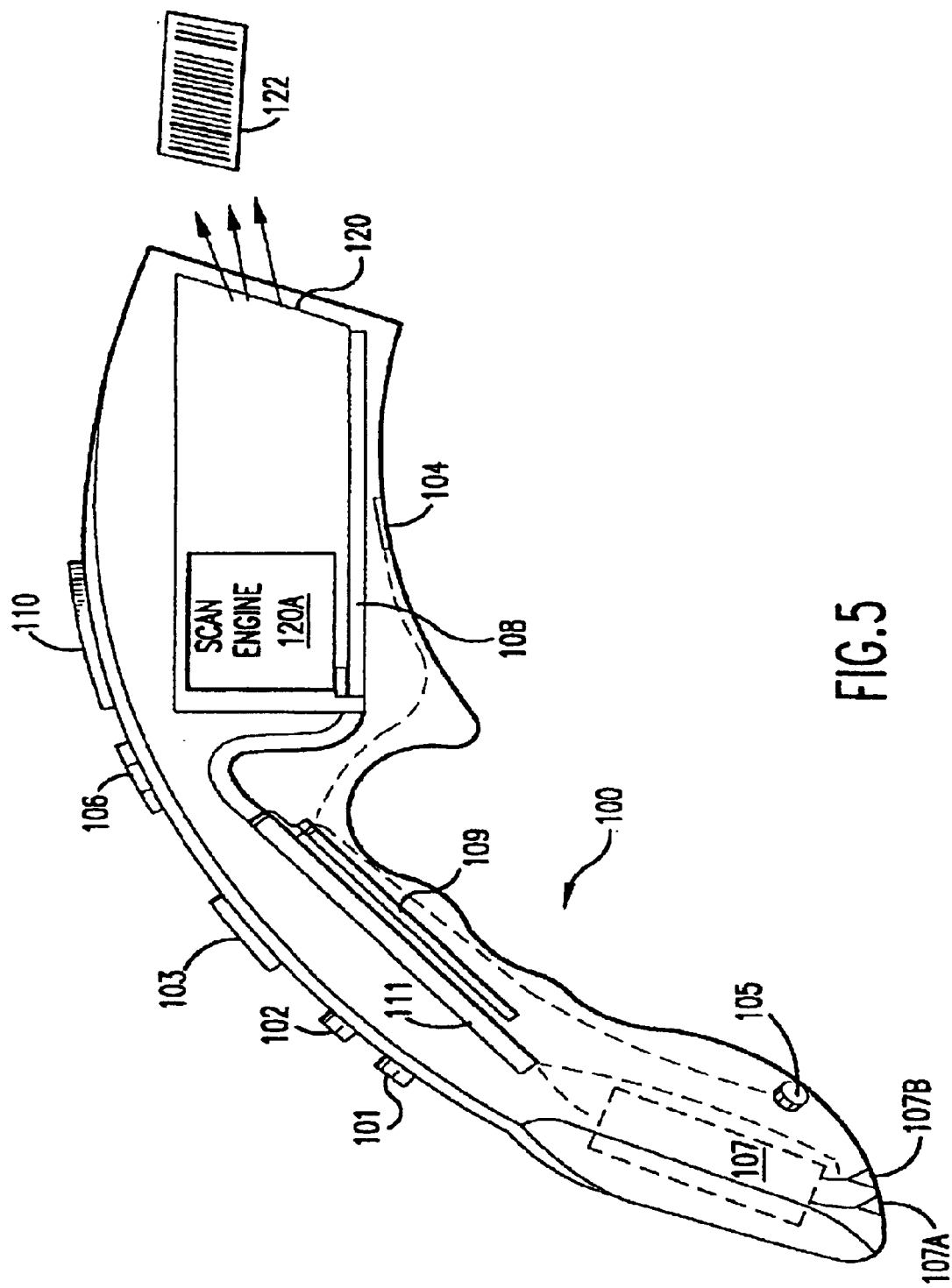
FIG. 5 is a cross-sectional view of the portable terminal illustrated in FIG. 4.

FIGS. 4 and 5 illustrate an alternative embodiment of a portable terminal of the present invention. In FIG. 4, terminal 100 is provided with a display 110. The display is a partial CGA display having a multi-contact navigational pad 106 for scrolling through the full video image presented to the consumer. In addition, the terminal 100 is also provided with a scanner 120 for reading bar code labels 122, three input buttons 101, 102 and 103, a speaker 104 and a microphone 105. The portable terminal 100 is equipped with a radio 108 and a rechargeable battery 107 inside the casing, shown in FIG. 5. Also shown in FIG. 5 are the main circuit board 111, the scan engine 120A, and battery recharging terminals 107A and 107B which are connected to a recharging circuit (not shown). A separate circuit board 109 is also shown for the optional telephony application. A battery overcharge protector circuit is also included but not shown.

Figure 11:
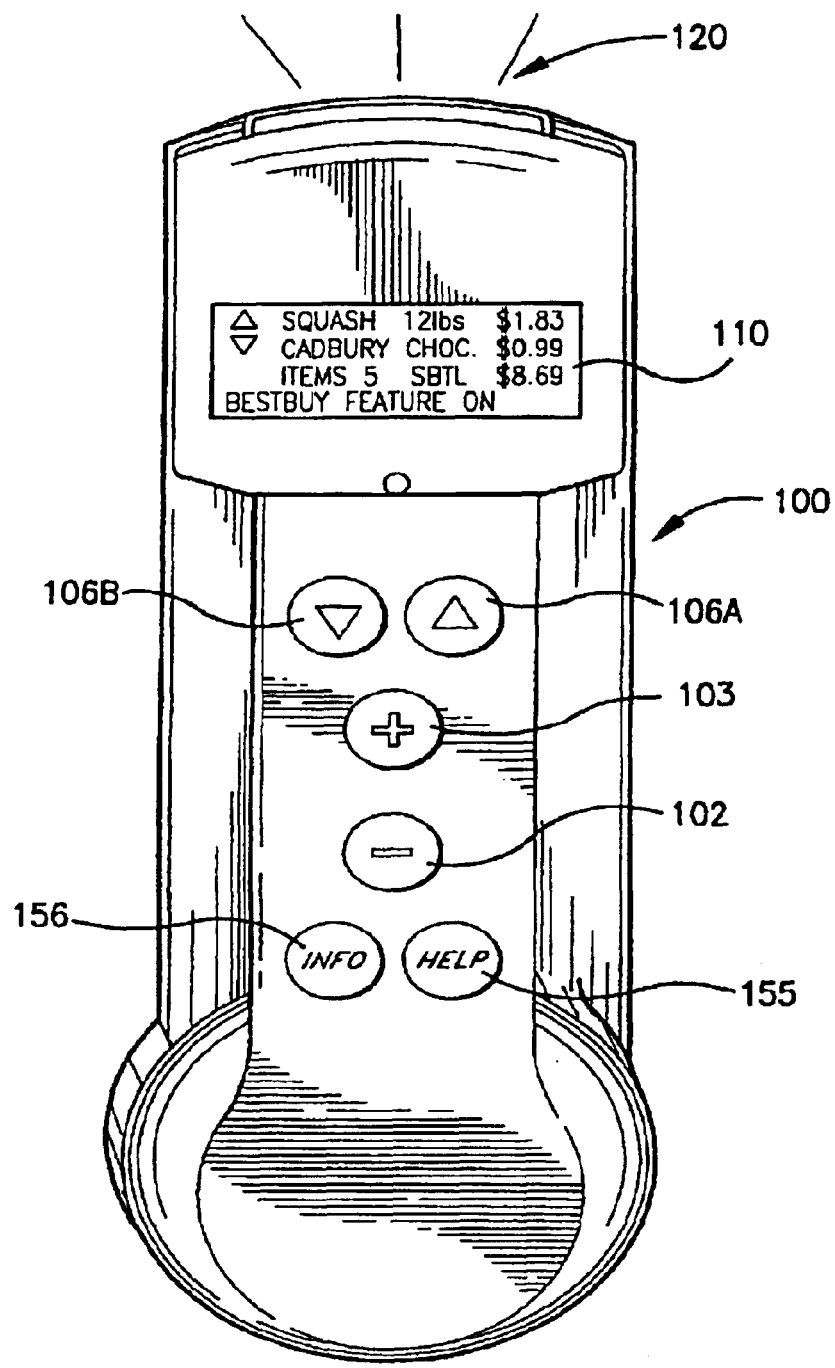
FIG. 11 is an alternative preferred embodiment of the present invention used in a self-scanning application.

An alternative embodiment of the present invention is illustrated in FIG. 11. The scanner is provided with a display 110, a plus key 103, a minus key 102 and two scrolling keys 106A and 106B. The terminal is also provided with an information key 156 and a help key 155. The information key can be employed to provide a customer with information on a selected item and the help key can be used to provide user assistance in the form of data displayed on the display or for calling an attendant to the terminal's location. In addition, if the terminal is provided with voice functions, the help key could automatically open a line of audio communication with a customer assistance desk. In the preferred embodiment of the portable terminal the help key is a bright color such as red, orange or yellow, and the information key is green or blue.

B. The Central Host

Figure 1:
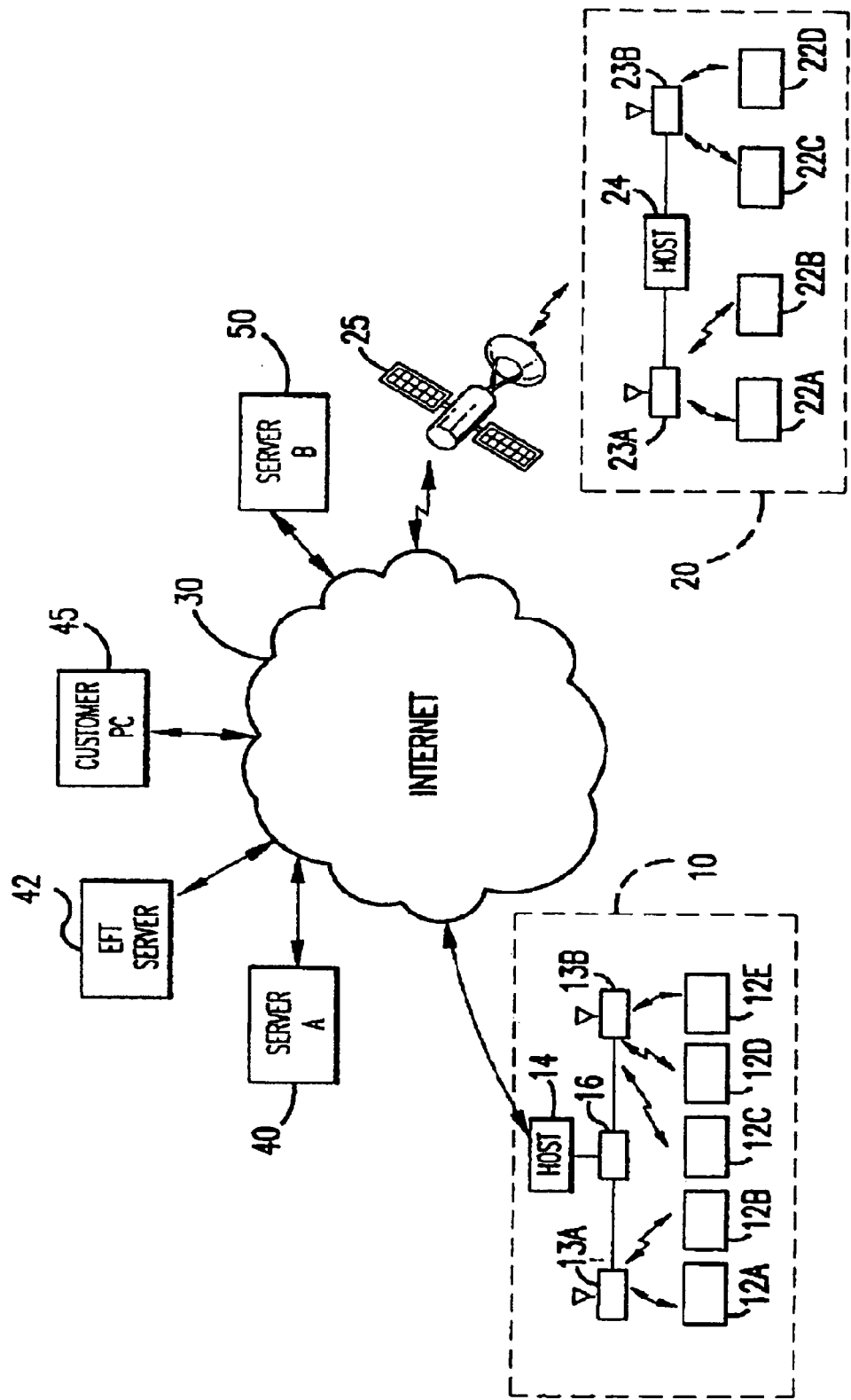
FIG. 1 is a general block diagram of a system employing a preferred embodiment of the present invention.

In the preferred embodiment illustrated in FIG. 1, portable terminals 12A, 12B, 12C, 12D and 12E in location 10 communicate to a central host 14 through multi-access points 13A and 13B. As described above, the terminals communicate in the local area network 10 with a SPECTRUM24 network. The network provides a transparent wireless connection to an Ethernet LAN 16 through multiple access points 13A and 13B. Preferably, each of the access points is compatible with the Simple Network Management Protocol (SNMP).

SPECTRUM24 employs a frequency hopping modulation technique that offers a high-capacity network by using multiple access points which may be connected to an existing wired LAN backbone. The system employs more than 70 non-overlapping frequencies which minimize the probability that one cell will operate on the same frequency at the same time as another cell. The system is designed to work in the 2 to 2.5 Ghz frequency band.

Data collected by the central host 14 through the Ethernet LAN backbone 16 (FIG. 1) is processed locally. To the extent the received data requires a response, the central host retrieves data, processes information and retransmits data to the portable terminals. In the event the terminal's request should require the retrieval of data not stored on the central host 14, the central host 14 may retrieve data from external sources such as IP addressable servers 40 and 50 through a wide area communication network 30. The terminal could also be used to transmit data to other LAN devices such as a manager's pager.

Host 14 may also use the wide area communication network 30 to communicate data to another host 24 at a related site 20. The two sites could also be linked to provide pass through communication between a terminal 12A located in site 10 and a terminal 22A located at site 20.

In a preferred embodiment of the present invention host 14 and host 24 communicate data over the wide area network 30 with open standard protocols and data types such as that used by an Internet server. Such a system would permit host 14 to retrieve and utilize data from servers without complex data conversion and translation routines. In a preferred embodiment, the open architecture standard is also designed into the portable terminals so that data files can be transparently retrieved by the portable terminals 12A–12E through to the host 14. With respect to sensitive and confidential data, it is preferred that the systems employ encryption technology or use a secure closed communication link.

C. The Self-Scanning System

In a preferred embodiment of the present invention, locations 10 and 20 (FIG. 1) are retail facilities employing self-scanning systems illustrated in FIG. 4. These systems are also sometimes referred to as self-checkout and portable shopping systems which terms will be used interchangeably herein. In FIG. 4, the portable terminal 100 communicates over a wireless communication network 130. In the illustrated embodiment, the multi-access point 13 (FIG. 1) is incorporated into a controller 150 which functions as the central host to the portable terminal 100. The controller 150 is coupled to an in-store point of sale (POS) controller 160 which may be an IBM 4680/90 or similar computer which includes price information and maintains statistical data as to purchases, discounts, inventory, and promotional information. Although these controllers are shown as physically separated items, they could also be logical distinct software items in a single hardware device.

The in-store controller 160 is coupled to the retail facilities point-of-sale terminals 170. The point-of-sale terminal 170 is used to receive payment from customers after they have selected items for purchase and to process customers not using portable terminals to collect items for purchase. Payment may be made by electronic means via a card swipe/reader 175 or through a standard cash/check transaction.

1. System Operation

Figure 9:
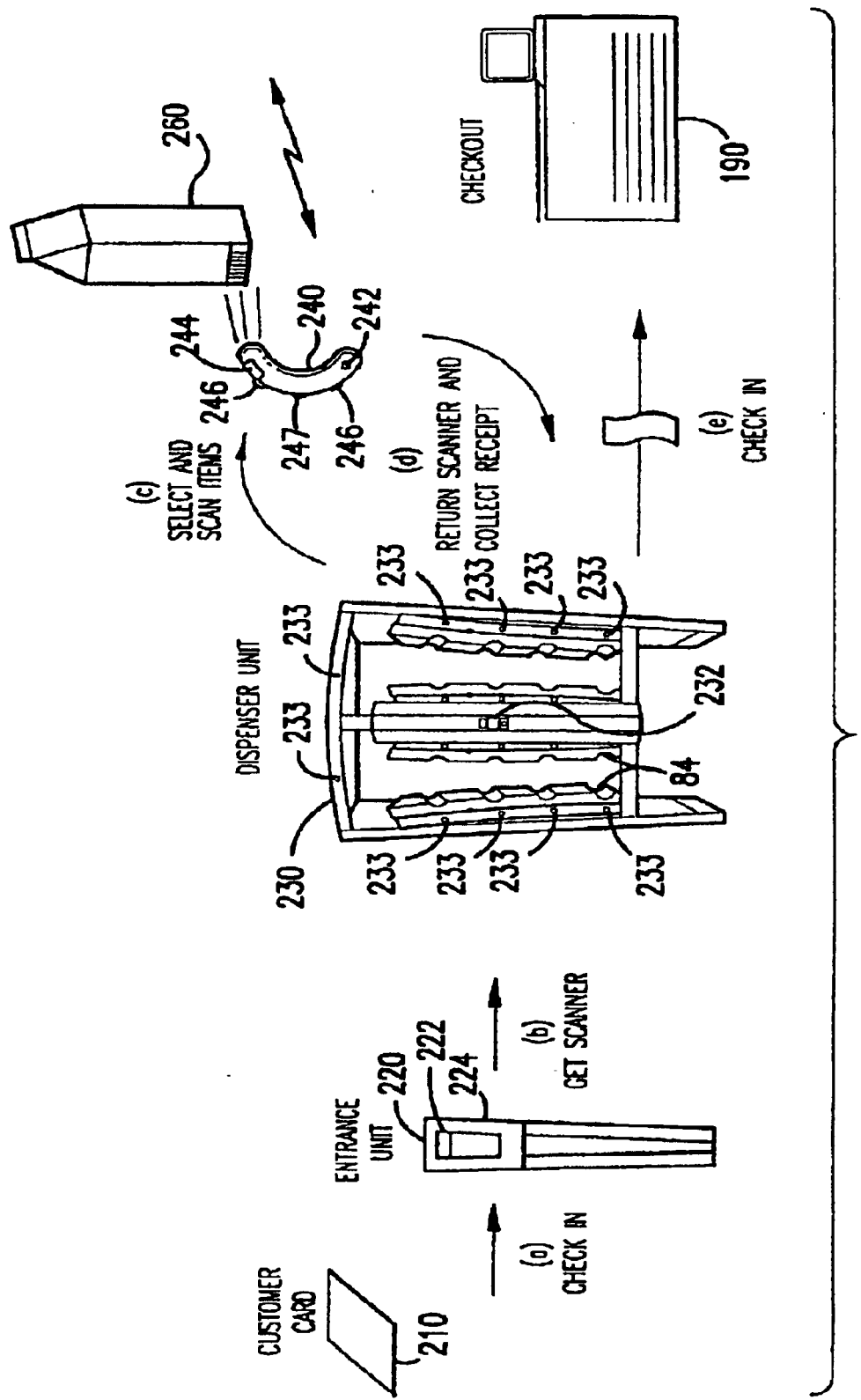
FIG. 9 is an example of system components used by a consumer in a self-scanning system employing a preferred embodiment of the present invention.

FIG. 9 illustrates various components of a self-checkout system employing a preferred alternative embodiment of the present invention. The system components are used by a consumer during a self-checkout transaction.

As illustrated in FIG. 9, a customer is provided with a customer loyalty card 210 having encoded customer data stored thereon. Corresponding customer information is also placed in a customer data file on a central storage system. Once a customer loyalty card 210 has been issued and a corresponding customer data file is established on the central storage system, the customer may then use the system to perform self-checkout of merchandise distributed in a facility employing the self-checkout system.

To use the system, a customer proceeds to an entrance unit 220 and inserts their customer card 210. A card reader on the entrance unit 220 reads the information stored on the card and checks with the central storage system to confirm that a corresponding customer data file exists and that the customer is authorized to use the system. Once system approval is obtained, a display unit 224 on the entrance unit 220 instructs the user to proceed to a designated area of a dispenser unit 230 to retrieve a designated data collection unit such as portable terminal with an integrated bar code reader 240. Although not shown, the self-checkout system could also be provided with an entry gate which is activated to permit entry of the customer upon the assignment of the bar code reader 240 and activation of blinking lights 233 located on the side of and above the dispenser which directs the customer to the location of the bar code reader 240 in the dispenser units. These entry and directional systems are especially necessary in large stores having a high number of dispenser units.

The bar code reader 240 is provided with a flashing light 242 to assist the customer in retrieving it after it has been assigned to the customer. The flashing light 242 is activated by the central processor (shown in FIG. 2) after it has been assigned to the customer and the assignment is recorded in the customer's data file. In an alternative embodiment, the bar code reader is further provided with an audible signal generator to assist the user in finding it in the terminal dispenser and a visual display for displaying either the customer's name or some other form of customer identifiable code. Although not illustrated, the dispenser system for the portable terminals could also take the form of a vending machine type dispenser or rotatable dispenser racks which rotate to provide a customer access to a selected terminal.

The hand-held bar code reader 240 is stored in one of a plurality of slots 234 in the dispenser unit 230. Each of the slots is physically and electronically marked and may be provided with locking means for locking the bar code reader 240 in place until the bar code reader is assigned for use to a customer. The physical marking is used to direct the customer to the proper location on the dispenser, i.e., location "A9," and the electronic marking is provided as a means for identifying the location of the bar code reader by the central processor. The electronic means may comprise a bar code located on the terminal dispenser 230 such that when the bar code reader 240 is locked in place, the bar code can be read by the bar code reader 240 and communicated to the central processor. Once the bar code reader 240 is assigned to a customer, the locking means is disengaged. In the event the bar code reader is not removed from the slot 234 after a predetermined time period, it is again locked and the customer data file for the customer to whom it was assigned is updated to reflect that the customer did not take possession of the reader within the allotted time period.

Prior to issuance to a customer, the bar code reader 240 could also be required to check battery level and scan the bar code located on the terminal dispenser as a self-diagnostic tool. In a preferred embodiment, the bar code is sufficiently degraded to test the outer boundaries of the bar code reader's capabilities. Thus, if the bar code reader is unable to read the bar code and communicate the bar code symbol to the central processor, it will not be assigned. The central processor will notify the supervising attendant that the terminal is not functioning properly.

Once a customer has been issued a bar code reader 240, the customer proceeds through the retail facility and uses the bar code reader 240 to record purchases. Preferably each item is either coded with a code which is recognizable to the bar code reader, or in the case of produce which is sold by weight, is provided with a machine for generating an adhesive bar coded ticket after the produce is weighed. Upon scanning of the code on a selected merchandise item 260, a display 244 on the bar code reader 240 displays product information such as price, product name, quantity and nutritional information. In a preferred embodiment of the present invention, the bar code reader 240 acts as a dumb terminal with radio frequency communication means. In such case, all information is stored in a central location and the bar code reader 240 simply sends and receives data from the central location.

In a preferred embodiment of the present invention, the reader permits a customer to add a product to their record through the selection of an "add" key 246, return a scanned product previously selected by selecting a "minus" key 247 or simply to perform a price check or other information check by pressing an "equals" key 248. In a preferred embodiment, the "equals" key may also be used to provide the customer with a running total of the products selected.

Once the customer has completed their product selection, the customer returns the bar code reader 240 to the dispenser unit 230 where it is placed in an open slot 234. Upon return of the bar code reader 240, information collected with the bar code reader 240 is processed by a central processing unit and a ticket for the items is issued to the customer from a printer 232 which is located near or on the dispenser. The returned terminal also transmits its terminal identification code and the address of the slot into which it has been inserted for tracking by the system controller 150. In an alternative embodiment of the present invention, rather than issuing a ticket at the terminal dispenser location, a card reader and data entry device 175 are provided at the cash register 170. The customer may then enter their customer card, with or without an authorization pin number, at the cash register location.

Prior to updating any customer data files, the customer is requested to insert the customer loyalty card 10 and/or enter a pin code to ensure that the customer is in fact the same person who initially retrieved the scanner. This is especially important in the event the system provides for electronic fund transfers for payment and information for such transfers are stored wholly or partially in a customer data file. Alternatively, rather than using a card the system could be provided with electronic signature or image capture to verify biometric identification, i.e., finger print or facial similarities.

Once the central processing system has successfully retrieved the customer information from the bar code reader 240, the customer then proceeds to a checkout register 170 for payment of the products selected. In the event a debit operation was made at the dispenser unit 230 through a card reader 175 and data entry device (not shown) which issues a receipt of payment including a list of purchased items, confirmation of payment. The checkout system may be an automated system or a manually operated system. The ticket is either scanned or otherwise read at the checkout 170 and the customer is asked to pay for the goods selected if payment has not been previously made.

Recognizing that some goods may not be scanned due to coding damage or other issues, a customer may proceed to a manned checkout station such as POS terminal 170 for the addition of items to their receipt. At such point, additional payment may need to be made using traditional payment schemes, or if the central processing unit is being used to provide a debit function, customer card and pin code information may need to be entered at the checkout facility. After all items are selected and the transaction is complete, the customer's data file is updated in the central processing unit to reflect the customer's shopping activities.

2. Customer Data Downloads

As discussed above, in a preferred embodiment of the present invention a portable terminal is provided with a high resolution graphical screen for displaying text and graphics to the consumer, and a two-way radio. In the context of the present invention, these interactive multi-media devices are employed to provide selective and broadcast data to consumers using the system.

In a preferred embodiment, each customer who uses the system has an associated data file stored on the central host including a customer preference list. Thus, when a customer is issued a portable terminal 100, the central host creates a transaction file for the customer to track the customer's shopping history and also downloads preselected preferences. Such preferences may be collected/activated when the customer signs up for the system or may be added or modified later through a customer service desk or kiosk (not shown) which is connected to the central host 150. The preference list may be stored on a computer database or on the customer's identification card.

Preferences may include display available information on:
  (1) cholesterol
  (2) calories
  (3) fat content
  (4) generic brand alternatives
  (5) better buy alternatives
  (6) brand name alternatives
  (7) electronic coupons
  (8) paper coupons
  (9) contests
  (10) News
    (a) general
    (b) metro
    (c) sports
    (d) markets
    (e) local events
    (f) celebrity news briefs
  (11) general advertising broadcasts
  (12) language
    (a) English
    (b) German
    (c) Spanish
    (d) French
    (e) Italian
    (f) other
  (13) size
  (14) special family event dates
    (a) birthdays
    (b) holidays
  (15) preferences of other family members if approved upon registration
  (16) frequent shopper point level, including those from partner companies (e.g., Blockbuster and 7–11)
  (17) product ingredients
  (18) allergy warnings
  (19) consumer watch group warnings
  (20 disability alert
    (a) hearing impaired
    (b) visually impaired
    (c) wheelchair assistance A user selects which, if any, of the following categories of information they would like to activate during their shopping transaction. Certain of the preferences may be activated by the scanning of certain items. Examples of such preferences are selections (1), (2), (3), (4), (5), (6), (7), (8), (9), (17), (18) and (19). For instance, if a customer has activated items (1), (2) and (5), the customer's scan of a pint of frozen yogurt may prompt the customer that the product has a certain amount of cholesterol and calories per serving and that a cheaper per serving alternative for the same brand is available in a one-quart container.

Certain data may not be item selection sensitive. For instance, if a customer selects that they are interested in receiving "celebrity news briefs" they may have a portion of their display function as a ticker-tape data field in which data regarding various celebrities is continuously displayed. The ticker tape may include story headlines which may be selected for presentation of a full story. Alternatively, if the screen is sufficiently large, a small segment of the screen may be devoted to video clips from relevant shows such as "CNN" or "Entertainment Tonight."

In the preferred embodiment of the present invention illustrated in FIG. 4, this information is downloaded to the portable terminal 100 over the wireless network 130. The portable terminal is a DOS or Windows operating system having a browser type graphical user interface. Data displayed on the terminal's display will include "links" to other information. Accordingly, when a "fat content" value is displayed on the display, the "fat content" indicator is underlined and highlighted to indicate that the selection of the "link" will retrieve additional information. If the link is activated by navigation keys 106 (or by touching the selection if using a touch sensitive display pad) the portable terminal will retrieve additional data through the controller 150. The data, such as recommended daily amounts, alternative products with lesser fat contents, etc. may be stored at the controller, in which case, the relevant information is downloaded directly to the portable terminal. Alternatively, the "link" represents a data file stored at a remote source such as the manufacturer's web page, in which case the controller 150 sends the request over a wide area network and retrieves the data and routes the data to the portable terminal. The link may also include embedded passwords and data request commands required by the remote server for retrieval of the highlighted data field.

The structure discussed above permits the retail facility to use standard programming tools such as HTML 3.0 for the creation of an Intranet/Internet environment for the operation of the portable terminals 100 and for ease of retrieving and converting data files from external sources for use on the system.

FIGS. 7A–7E illustrate an application of the present invention on a portable terminal employing a four by twenty line display in which each line consists of a five by eight pixel matrix which can be converted to pixel data to generate graphical characters.

Figure 7A:
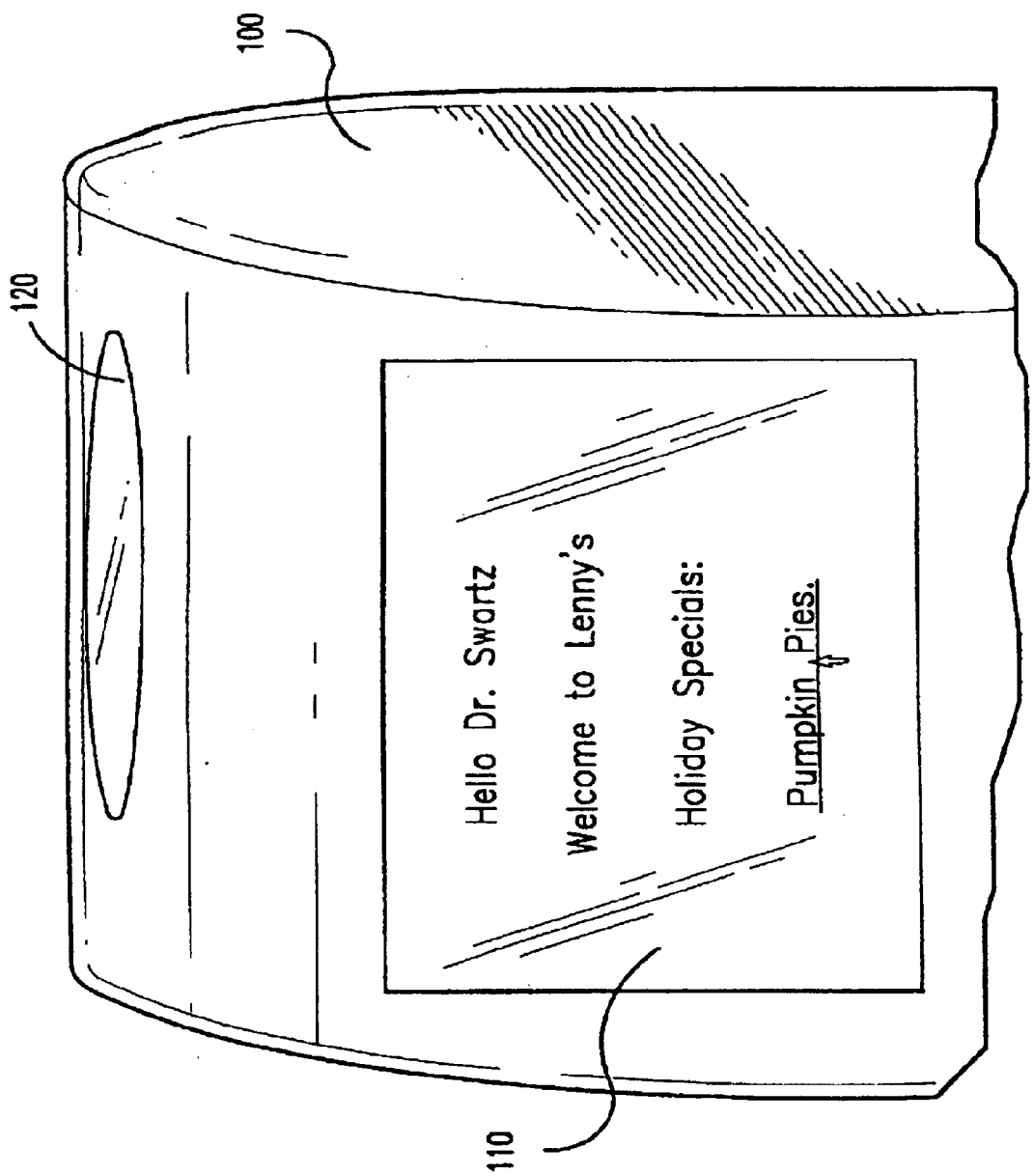
FIGS. 7A–7E are illustrative examples of display outputs employed in a self-scanning system employing a preferred embodiment of the present invention.

FIG. 7A illustrates the initial screen of a portable terminal upon retrieval of the unit. As illustrated in FIG. 7A, a generic message is displayed to each user which includes a message regarding a Holiday Special: Pumpkin Pies. The item is underlined indicating that the selection may be activated to retrieve additional information. In this case, although not shown, the information retrieved would indicate the price and size of the pumpkin pie special, the location within the store where the pies are located and another link marked "Additional Specials".

Figure 7B:
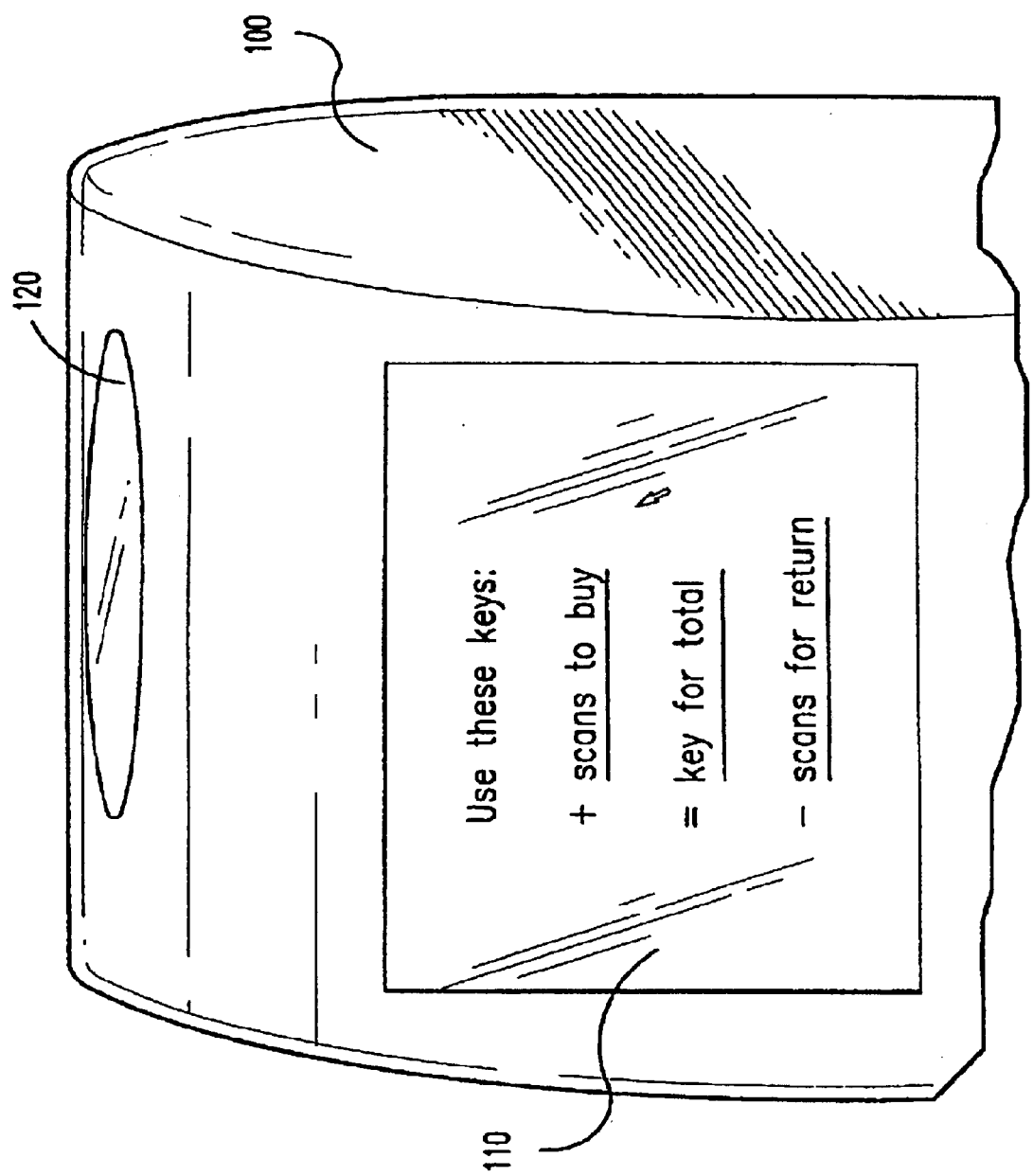

In the event no selection is made and no other key is pressed within a predetermined amount of time (i.e., 10 seconds), the screen will display the instructions illustrated in FIG. 7B. In FIG. 7B the activation of any link will result in the display of additional information pertaining to the use of the keys on the portable terminal and a prompt for the selection of a different language in the event the originally selected language was incorrectly entered.

Figure 7C:
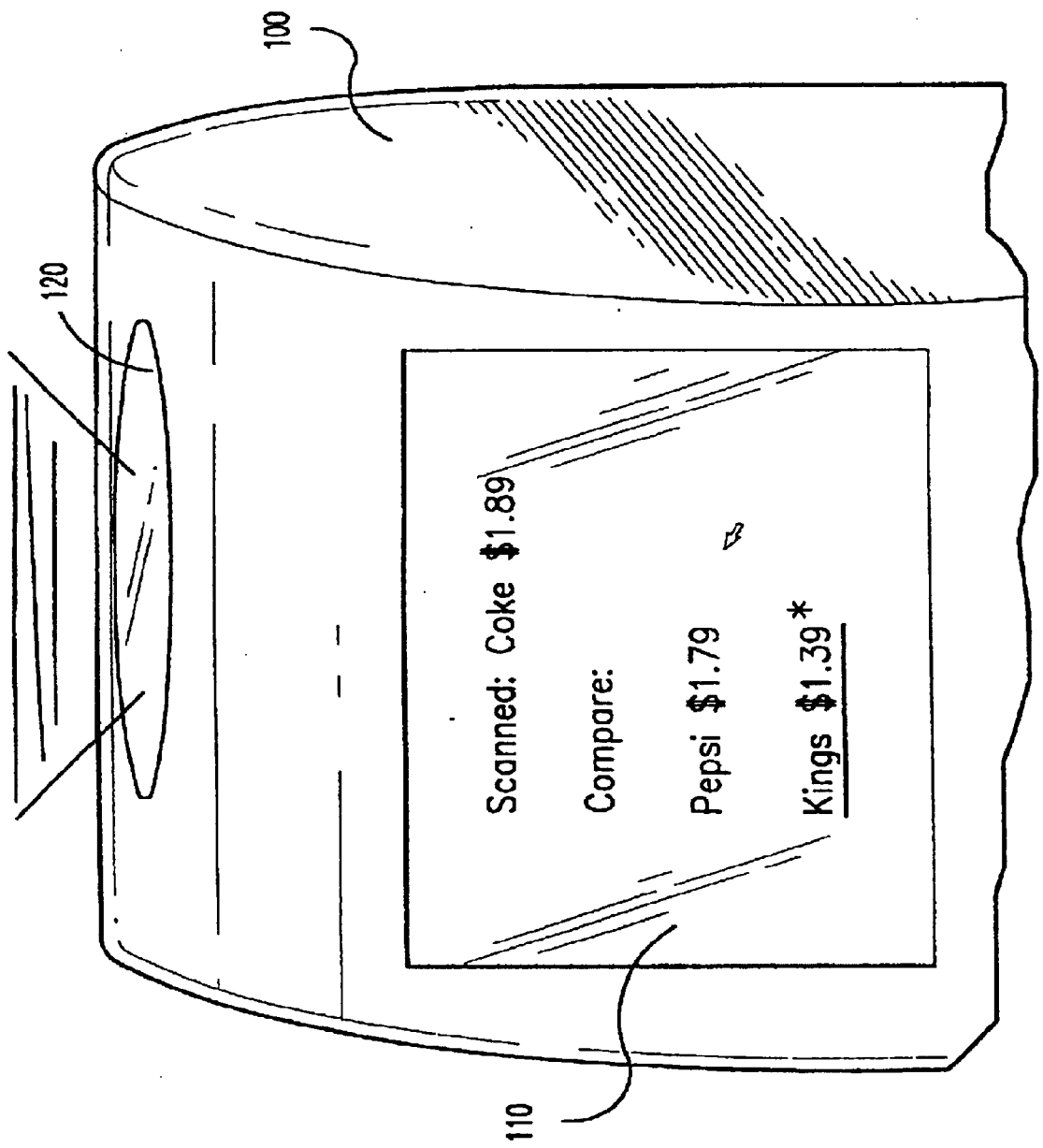

FIG. 7C illustrates the use of a comparison function by the portable terminal. This feature is activated by the consumer upon the entry of the customer preference choices discussed above, or in the alternative is automatically activated by the retail facility upon scanning of an item with the scanner 120 display. The feature causes the graphical display 110 to display an identification of the item scanned and its cost. In addition, the display also displays alternative brands and their costs. In the illustrated example, one selection, King's, includes a link with a marker, a star, indicating that an electronic coupon is available for the selected item. Selection of the item for a buy would automatically download the electronic coupon into the customer's transaction file. In the event the item is scanned for return, the electronic coupon is deleted from the consumer's data file.

Figure 7D:
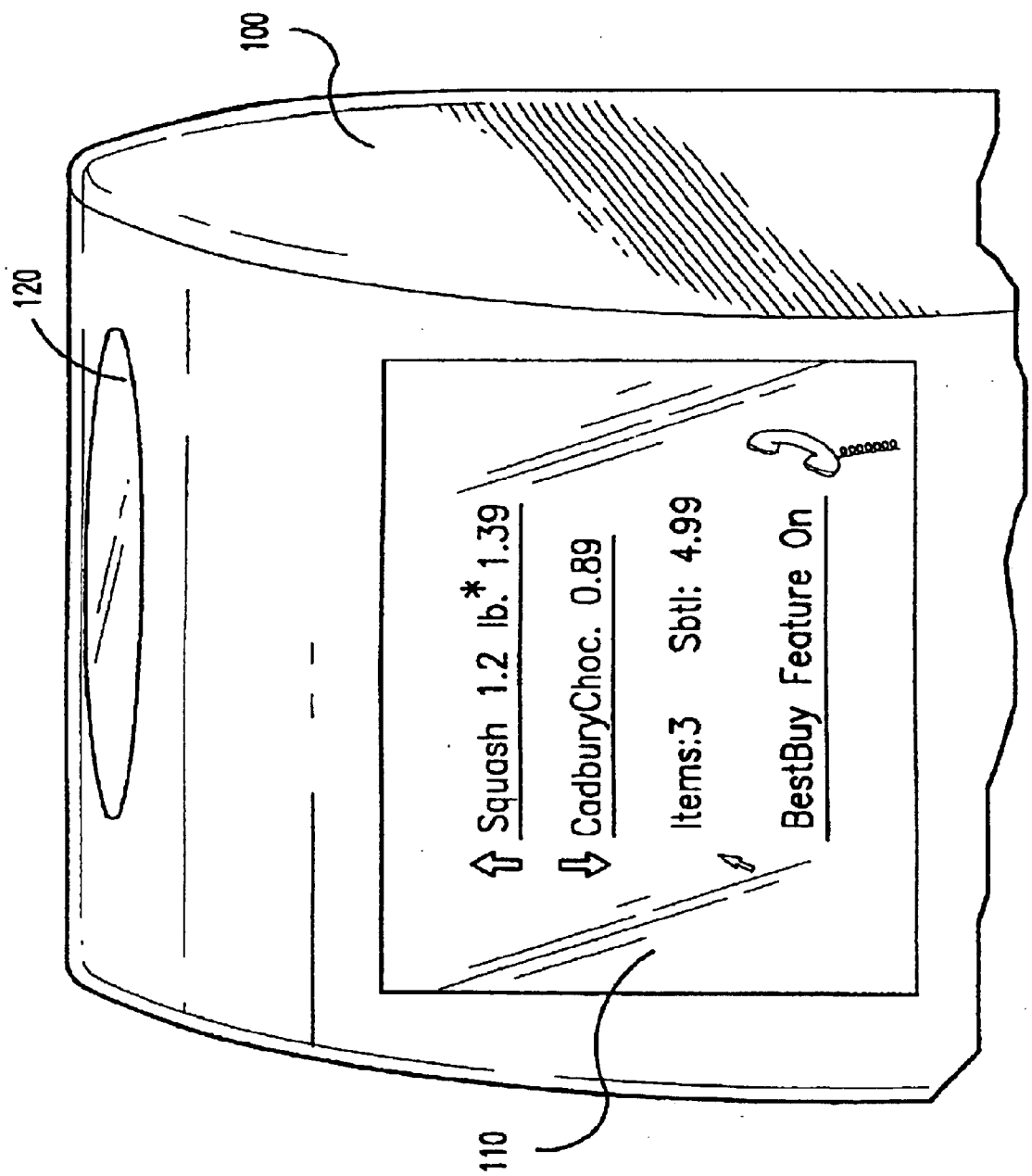

FIG. 7D illustrates a sample screen 120 after a consumer has selected several items for purchase, and pressed the equals key to display the current total. The portable terminal downloads information from the central controller once the "equals" key has been activated. The information is then displayed on the display 110 providing the consumer visual confirmation that the items have been scanned for purchase. A consumer may see all the items by scrolling through the list by placing the cursor on the arrow keys and pressing the activation key. The list line on the display indicates that the Best Buy feature is on. Selection of that link will disengage the feature. In the event multiple features are available, a multiple feature link could also be displayed to provide a menu of links which will turn various features "on" or "off" as the case may be. The two selected items are also highlighted to indicate that an electronic coupon has been used for the Squash and that cheaper buys are available for Cadbury Chocolate purchase. The latter link would be disengaged and not shown in the event the Best Buy feature was not activated.

Figure 7E:
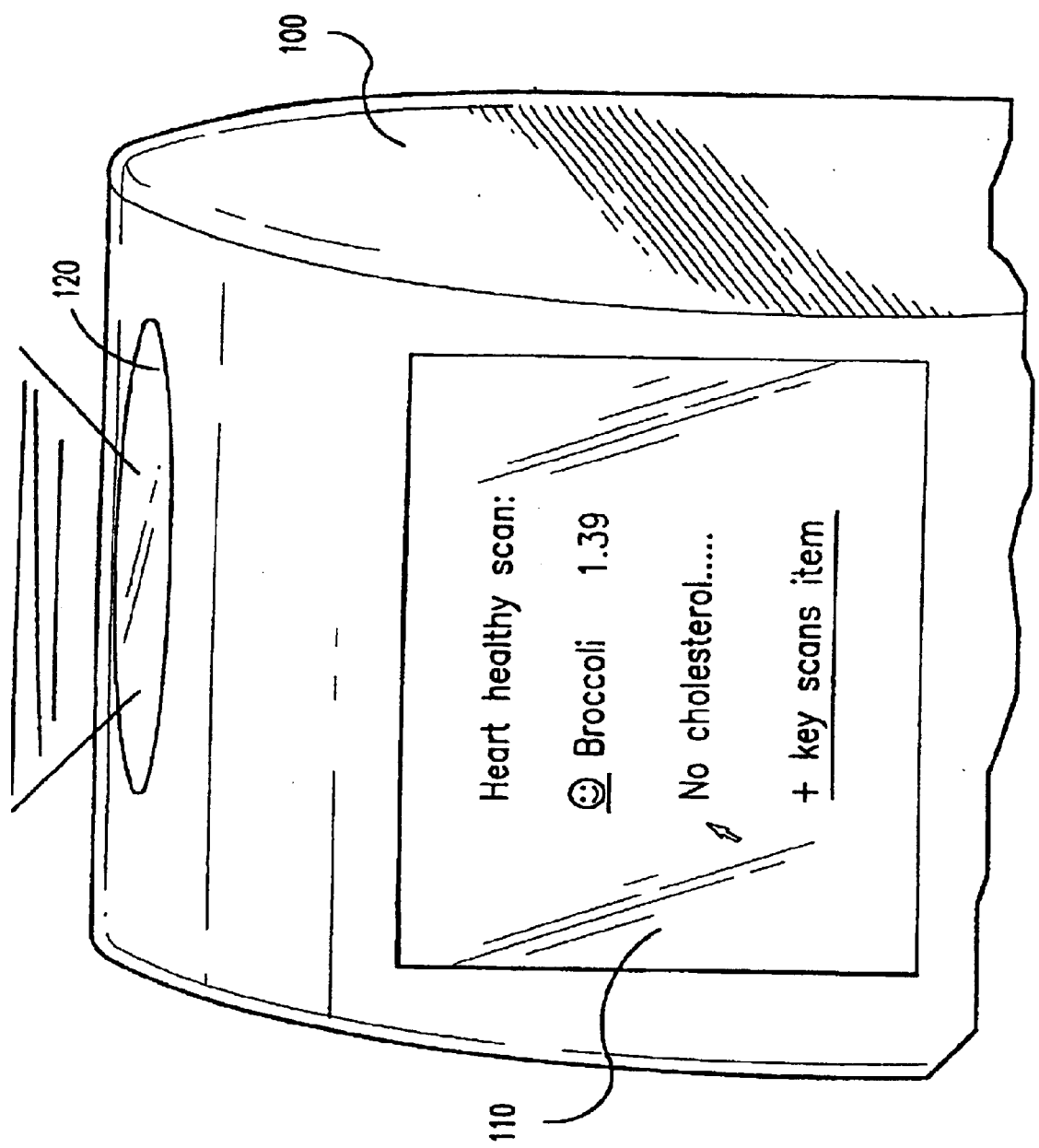

In FIG. 7E, an example is provided of a consumer using the cholesterol preference. The consumer has scanned an item of broccoli, a no cholesterol item. The scanned item is displayed with a friendly message and a happy face which in this case acts as a "link" to a consumer's advocate home web page available on the Internet which provides various data and recommendations on how to prepare broccoli and other healthy foods. The selection of this link, in the illustrated example, would download a text-only version of the web page. In the event a larger display was used such as that shown in FIG. 2, the graphics version of the page would be displayed.

The portable terminals could also be used to download audio data files. This would be especially useful to visually impaired consumers. Those consumers who have difficulty reading small print such as nutritional information on items would be able to scan an item and find its price and nutritional data through an audio output. In the event a consumer requires assistance, the portable terminal could also be provided with a working telephone subsystem.

Each unit is provided with a unique IP address. A consumer who sends out audio data or an assistance request may receive audio assistance. In a preferred embodiment, a consumer selects the help link associated with any of the selection keys, as illustrated in FIGS. 7B and 7E, or selects an audio link as illustrated in FIG. 7D. This selection generates a help request command to the controller which forwards the request to a service desk or other network device, which may be located at a point-of-sale terminal location 170. Once the clerk responds to the message request, the clerk opens a voice channel with the consumer which provides for a telephone type communication. Although the data is transmitted using packed data communication techniques using the portable terminal IP address, the communication networks described above provide for adequate throughputs to establish a real time communication link. Thus, if a consumer needs assistance in retrieving an item from a top shelf or has injured himself, he can communicate his message directly to a customer service attendant.

Figure 8A:
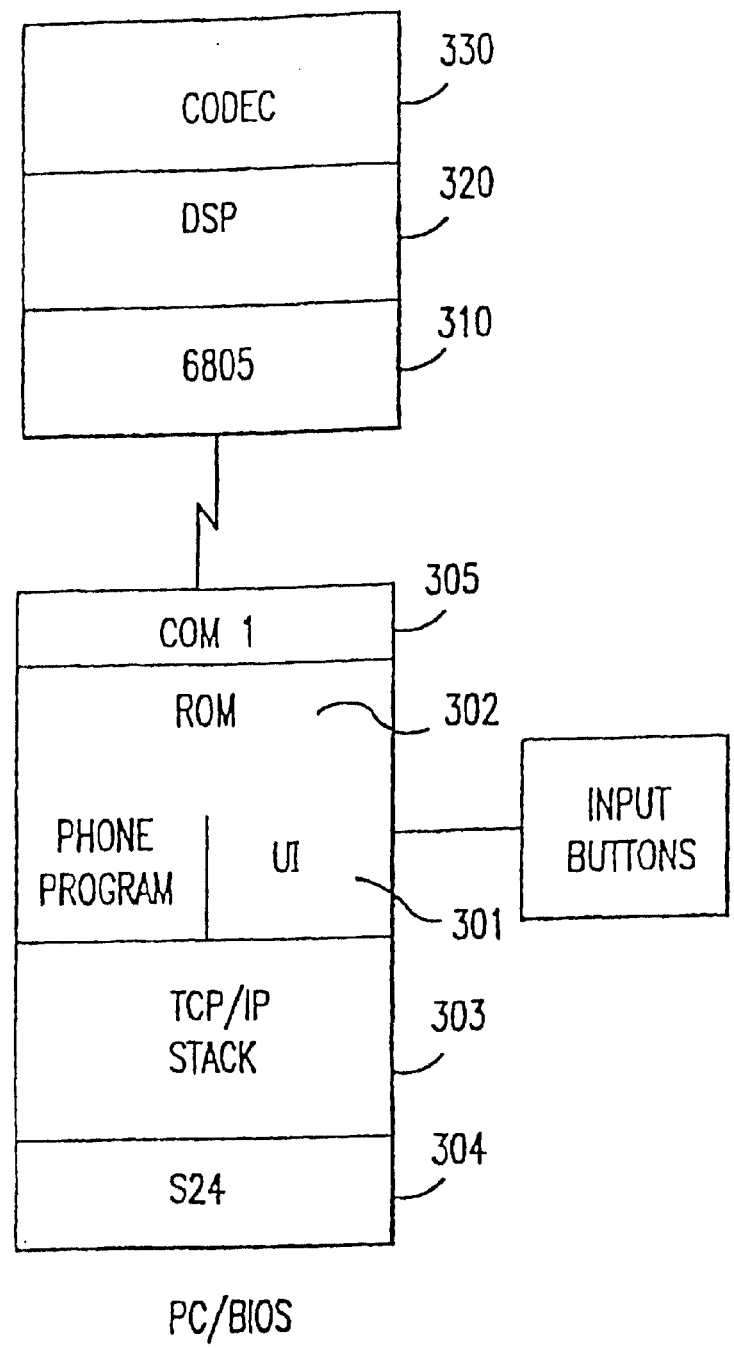
FIGS. 8A and B are general functional block diagrams of alternative preferred embodiments of a telephony system used in a portable terminal of the present invention.

Illustrated in FIG. 8A is a block diagram of a preferred embodiment of a telephony system employed in a terminal of the present invention. In FIG. 8A, a PCM CODEC (coder/decoder) chip 330 is connected to a CT8015 DSP chip 320 and a 6805 processor chip 310. This chip set is connected to a communication part of the terminal which is provided with a data input user interface 301, and a phone program 302 stored in read only memory. The phone program utilizes a TCP/IP or other protocol stack 303 which communicates packet switched data over a SPECTRUM24 radio PCMCIA card 304. The audio input and output are configured to be placed next to the user's ear and mouth similar to a standard telephone handset and to provide an echo, so that a user can hear what he is saying when he speaks into the microphone. This configuration is preferred in any system in which the terminal is being held up to the user's head for use, such as that shown in FIG. 4.

The 6805 chip 310 sends and receives packets of data between the CT8015 DSP chip 320 and the serial port 305. Packets received from the CT8015 on the terminal's CPU via the serial port 305. The user interface software is designed to identify the selection of an IP address on the display. Alternatively, the user interface 301 could simply send a telephony request message and wait for a telephone communication channel open command to be received from the controller over the wireless communication link.

The phone program is a memory resident (TSR) program and handles the actual processing of audio communication which includes processing user interface data, routing the packets from and to the SPECTRUM24 network, and routing packets from and to the local CT8015 chip. The phone program 302 also performs the handshaking procedure with the CT8015 chip 320.

Figure 8B:
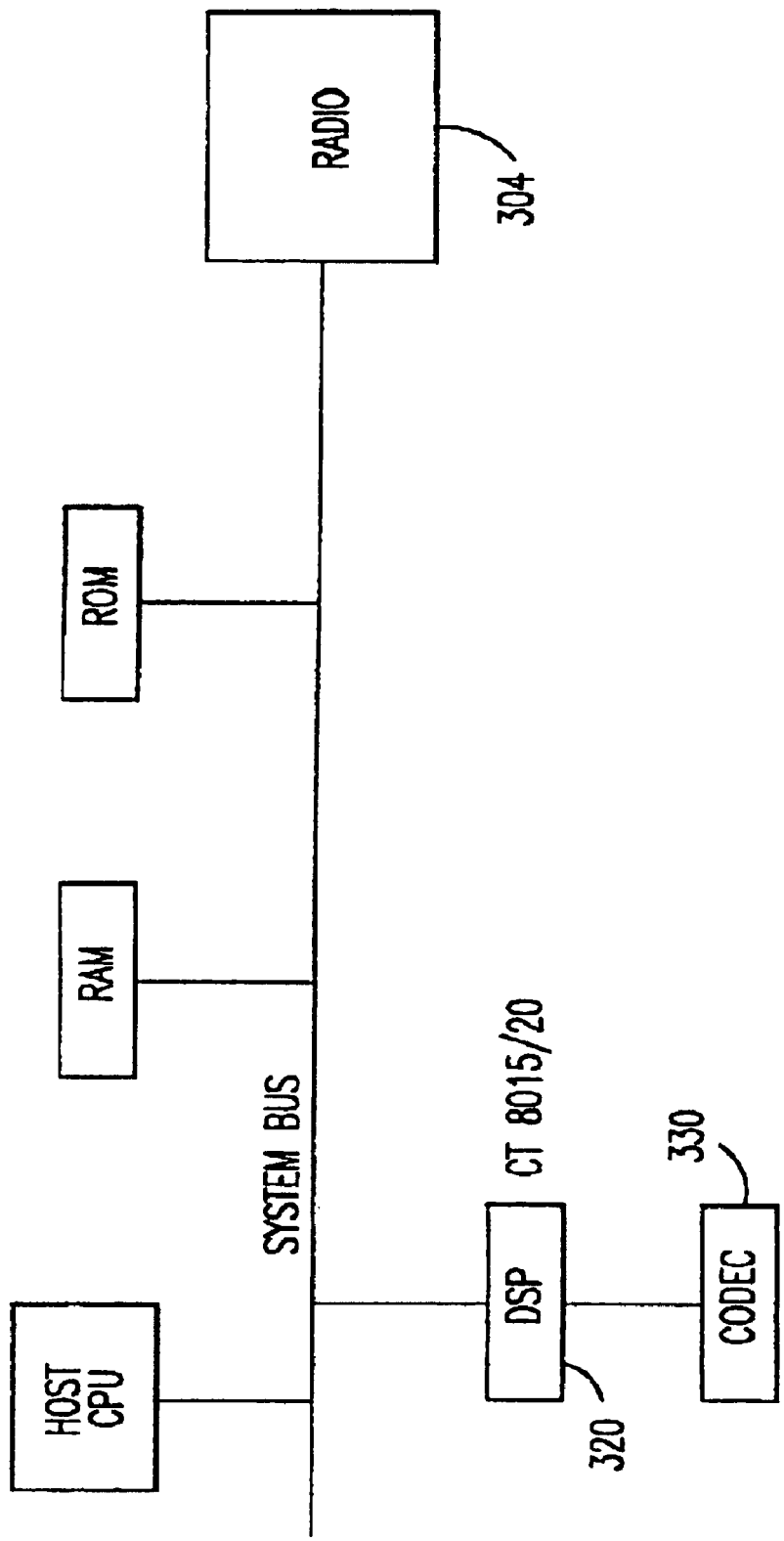

Illustrated in FIG. 8B is an alternative preferred embodiment of the architecture which may be used in a device of the present invention to effectuate telephony application. Although the architecture illustrated in FIG. 8A is preferred in systems wherein the telephony application is to be added through corn port corn 1. The architecture illustrated in FIG. 8B is preferred in systems in which the application is to be built as an integral part of the system architecture.

The two-way audio system of the present invention permits retail facilities to transmit emergency broadcast messages on the portable terminal and permits customers to respond quickly. For instance, inquiries as to a lost child could be made by a parent and retransmitted to all other users in the store or to a service attendant, located near the store exit who can ensure that the lost child is not permitted to leave the facility. Moreover, the phone system permits facilities having multiple locations to use service desk assistants located at a central location to service multiple locations. A store need not set up a telephone help desk at each location. In addition, the telephony application could also be implemented to provide (i) customer notification upon the availability of an ordered item (i.e., deli order is ready), (ii) place orders for out-of-stock items, and (iii) identify the location of all store shoppers and employees.

3. In-Store Marketing

The self-shopping embodiment of the present invention permits broad in-store marketing programs including pinpoint marketing, coupon distribution and coupon tracking. An example of a preferred marketing system employed in a system of the present invention is described below.

The application of an electronic coupon system has been previously described above. In the event electronic coupons are not available for a particular product, the system, i.e., software on the central host, could be provided to identify the existence of other couponing or discount system applicable to a scanned product. For example, some retail facilities provide coupon dispensers at entrance points and in aisles. If such a coupon system exists for a scanned item, the controller generates a link for the scanned item, identifying the nature, availability, conditions, locations and amount of savings generated by the coupon, and the customer may then proceed to the location and physically retrieve the coupon or be provided with an electronic version of the coupon. In the event a hard copy of the coupon is retrieved a coupon redemption center may then be provided for expedient conversion of the coupon into the customer's transaction file. Alternatively, the coupon can be presented at a checkout register or, if the coupon is provided with a machine coded label, i.e., bar code, it may be scanned with a portable terminal which will register the coupon on the system and apply it to a previously scanned or subsequently scanned item. This pre-scanning of coupons may be performed by a customer at the store or at home using a home scanner (such as one attached to the customer PC 45) and downloaded into the customer's data file at the facility.

In order to provide coupon functions, the central host is provided with a database of available electronic coupons and hard coupons. In a preferred embodiment, the system automatically creates a linked page for scanned items including any associated information matching a customer's preference profile. The system will employ a dynamic page builder using a predetermined coupon template wherein a hyperlink to a page of coupon data is presented. In the event the page exceeds the display limitations of the display (i.e., requires more lines than are available on a single display) for the terminal in use, the page builder automatically creates a new "next page" link to be displayed on the terminal. The dynamic page builder program also permits an override function in the event a link is provided to an external web page address. Using the IP address of the portable terminal, the central host will retrieve the file from a remote site (i.e., an Internet server) and retransmit the web page to the portable terminal. The retransmission by the central host will include any reformatting constraints which are applicable to the destination portable terminal which may only have a partial view screen capability. The resulting collection of data may then be transmitted to the in-store system by E-mail transmission or through a data collection article such as a smart-card or a floppy disk. Store receivers (i.e., kiosks) would be installed to load such data on to the customer's data file.

In addition to the coupon schemes discussed above, the central host also provides and tracks other marketing programs in response to the scanning of predetermined items by a consumer using a portable terminal of the present invention. One example is a "buy two and get a third item free" or "for fifty percent off" discount prompt at the display. In the event of company rebates, the system could be employed to generate automatic redemption requests by the system. In accordance with a preferred embodiment of the present invention, the central host generates a list of consumers who have bought articles having a rebate feature. The store may then print fully formatted rebate requests upon receiving payment from the consumer or automatically communicate the rebate request to the company providing the rebate. This would provide for the automatic rebate of funds to the consumer or for the crediting of the consumer's account at the specific facility. The central host also maintains detailed logs as to the nature, quantities and results of such transmissions.

D. Order Entry and Fulfillment

In another preferred embodiment, the central host is programmed to inform customers that a selected item is a restricted item and cannot be purchased by the consumer at that time. For instance, in some states alcoholic beverages may not be sold on Sundays prior to noon. Thus, if a consumer scans the product for purchase, the portable terminal will display a message or play an audible message conveying the prohibition. Similarly, if a customer who is below the minimum drinking age attempts to purchase an article of alcohol, they will be reminded of the drinking age and a notice will be provided to the local service attendant upon an attempted payment that a person of unknown or insufficient age has attempted to buy an age restricted item. Alternatively, if a family member is allergic to an identified product such as "peanuts," a reminder or notice could be identified which informs the purchaser of such ingredients in a selected product.

In another embodiment of the present invention, the portable terminal is used to present advertising messages to the consumer. The central host will detect items scanned by the portable terminal having an associated advertising message or video display. Thus, when a consumer scans a "Coke" can, he may receive the voice message "COKE IS IT." Alternatively, the central host may also maintain a file of the customer's prior purchase records, and detect correlation of purchased items. If such a correlation to a scanned item is identified, the portable terminal may be prompted to display a message reminding the consumer to purchase other associated products or products usually purchased by the consumer but not currently selected. For example, if a consumer purchases hot dogs, the central host may send a message to the portable terminal, "Do you need hot dog buns and mustard?" The message would be dependent on the customer's transaction list and prior purchasing history. If a positive response is selected, the display would present a new page providing cost and location data. In addition, if the customer's prior purchase record indicates that the customer usually buys charcoal with hot dogs or hamburgers, the terminal may also ask the customer if he needs "Charcoal." Again, the prompted items would be provided with a link to an informational page to provide cost and location. The item prompts would also be turned off in the event the central host determines that the product is out of stock.

In an alternative embodiment, the central host prompts the portable terminal to display customer specific data and external advertising messages. For instance, if a customer comes in on their birthday the store could offer the customer a free coffee and chocolate cupcake. Alternatively, a local hair salon could send a message to all consumers who scan a particular high-end beauty product.

In another preferred embodiment of the present invention, the central host also provides for the uploading of customer shopping lists. Thus, a customer may generate a shopping list and Email the list to a predetermined secure (i.e., password protected) Email address. The customer's Email address would be predetermined and automatically associated with a customer's file at the shopping facility. When the customer is assigned a portable terminal, the portable terminal's initial prompt will also include a message link indicating that a message has been received for the customer. The selection of the link would cause the Email message to display on the portable terminal.

Figure 10:
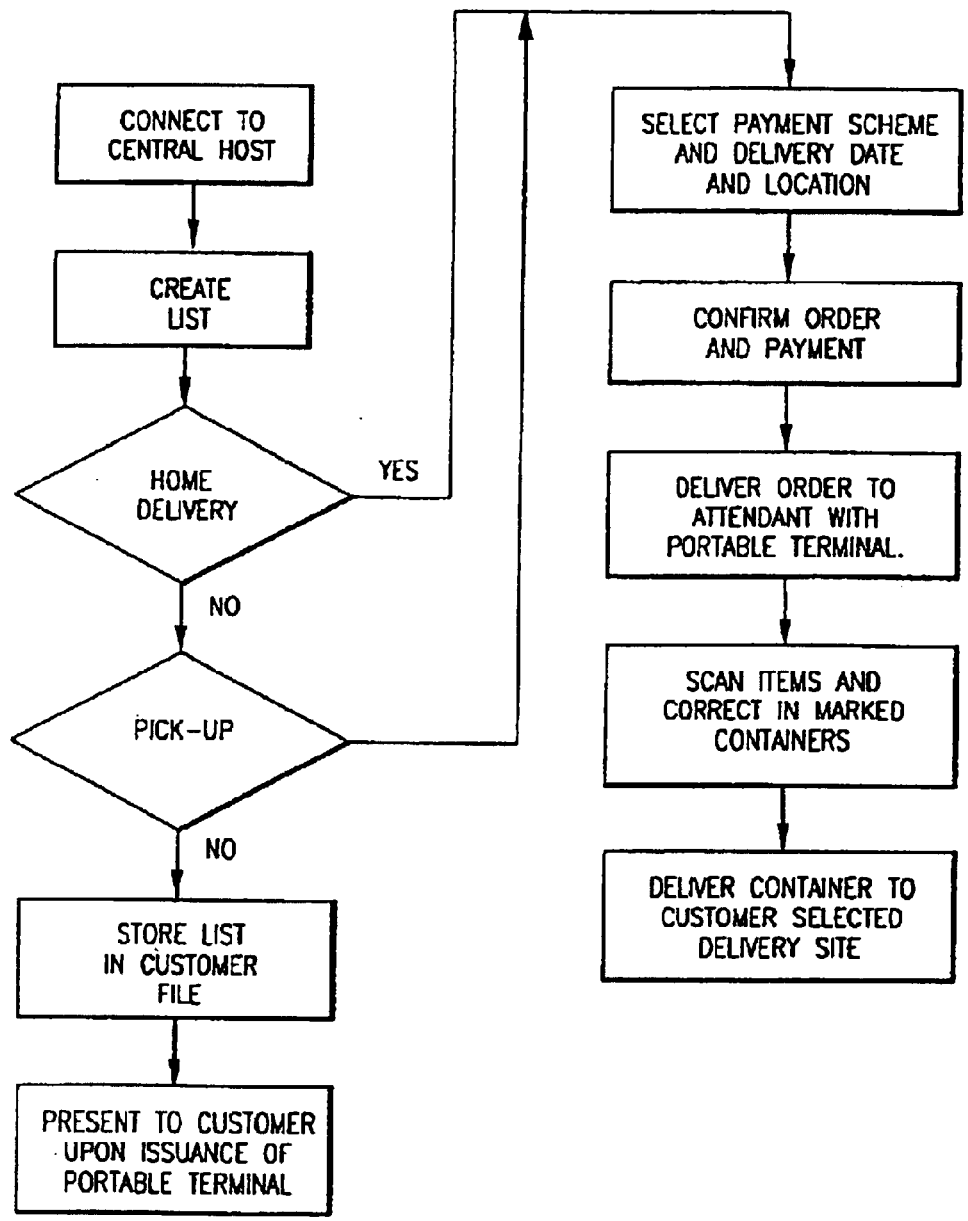
FIG. 10 is a flow chart of a home shopping delivery system employing a preferred embodiment of the present invention.

In a further embodiment of the present invention, the central host delivers to the customer via an Email address on a customer's PC 45 (FIG. 1) a list of previously purchased items, or in the alternative, the central host makes available on a customer accessible but password protected web page the customer's prior purchase records and a complete listing of available items at the store. As described in FIG. 10, the customer may then select items for inclusion on a customer specific shopping list by checking specific items which are to be purchased and the quantity required for purchase. By using the item selection method, i.e., selecting from a store's list of available goods, the list may be used to prompt customers on their next visit to the store the exact location and price of the selected items on the list by ensuring that the notation used by a customer for items selected for purchase will match the product identifiers used by the central host. The above described shopping list system also permits for home delivery of items because of the assurance of a match between items selected by a customer and items including brand, quantity and price available at the facility.

In a preferred embodiment of the present invention, the customer selection of items is made through a graphical use interface which simulates a store layout, i.e., aisles with items in them as they are stacked within the store. This permits the user to simulate an actual walk through the store and thereby find items they know are located in certain aisles of the store. Once the customer has completed their selection the shopping list is also provided with a general comment section to provide special instructions to the store or reminders to themselves. It is preferred that the central host acknowledge receipt and recognition of selected items by Email response or telephone call to the customer's location. In the event of an Email order for home delivery, it is also preferred that the customer receive a telephone call to ensure that the customer has in fact placed the order and to provide credit card verification information if the order is to be paid in the form of an electronic find transfer.

The order entry system can be manipulated to provide pick-up service, emergency delivery service, same day delivery service and regularly scheduled delivery. A customer may have staple items delivered every Saturday and supplement such deliveries with other delivery services as needed. In the event of an emergency, such as a customer who runs out of baby food, formula and diapers, the customer may order emergency delivery service. The store can promote various services by charging (or giving discounts) as is appropriate under the circumstances (i.e., traffic conditions of the system). In the event of regularly scheduled deliveries of staple items, the system may be provided with redundancy features and confirmation notices to ensure that the customer will require the items to be delivered on the next regularly scheduled delivery, and ensure that the customer is not away on vacation. The system could require that a customer respond to a confirmation notice such as an E-mail message or an automated telephone query, i.e., this is an automated confirmation system for your delivery scheduled for tomorrow morning, please press 1 to confirm the delivery, press 2 to cancel delivery, press 3 to reschedule the delivery.

Once the customer's order has been placed electronically, a store attendant using a portable terminal of the present invention is prompted to collect items for delivery to the specified customer on the day of the scheduled delivery. The attendant collects and scans items which have been selected for purchase. In the event a product is not available because it has been depleted subsequent to the order being placed, the attendant is provided with an out-of-stock marker. The marker could be a bar coded command on a bar coded command sheet provided to the attendant which could include scannable instruction codes such as "Begin new client collection," "Out of stock item," "Suspend client collection," "Cancel client collection" and "Scan bag for client." For example, in the event the item selected by the customer for purchase is out-of-stock the bar coded command indicating that the item is out of stock is scanned by the attendant. The shopping list delivered to the customer is then modified to indicate the item has not been included for delivery to the customer. In a preferred embodiment of this system, the customer may mark items as "essential" or "required for delivery" so that key ingredients (as in recipes) are not omitted which would make the rest of the requested items unnecessary. Thus, if a customer selects items on a list based on a recipe which is suggested on the store's home page, and a critical element is not available, all the items on the recipe may be withheld. This "requirement" condition can be tagged to the complete list or simply a portion of the list using any number of methods which would become obvious to one skilled in the art subsequent to reading this description. Essential items could also be linked to or marked with alternative products.

Figure 12:
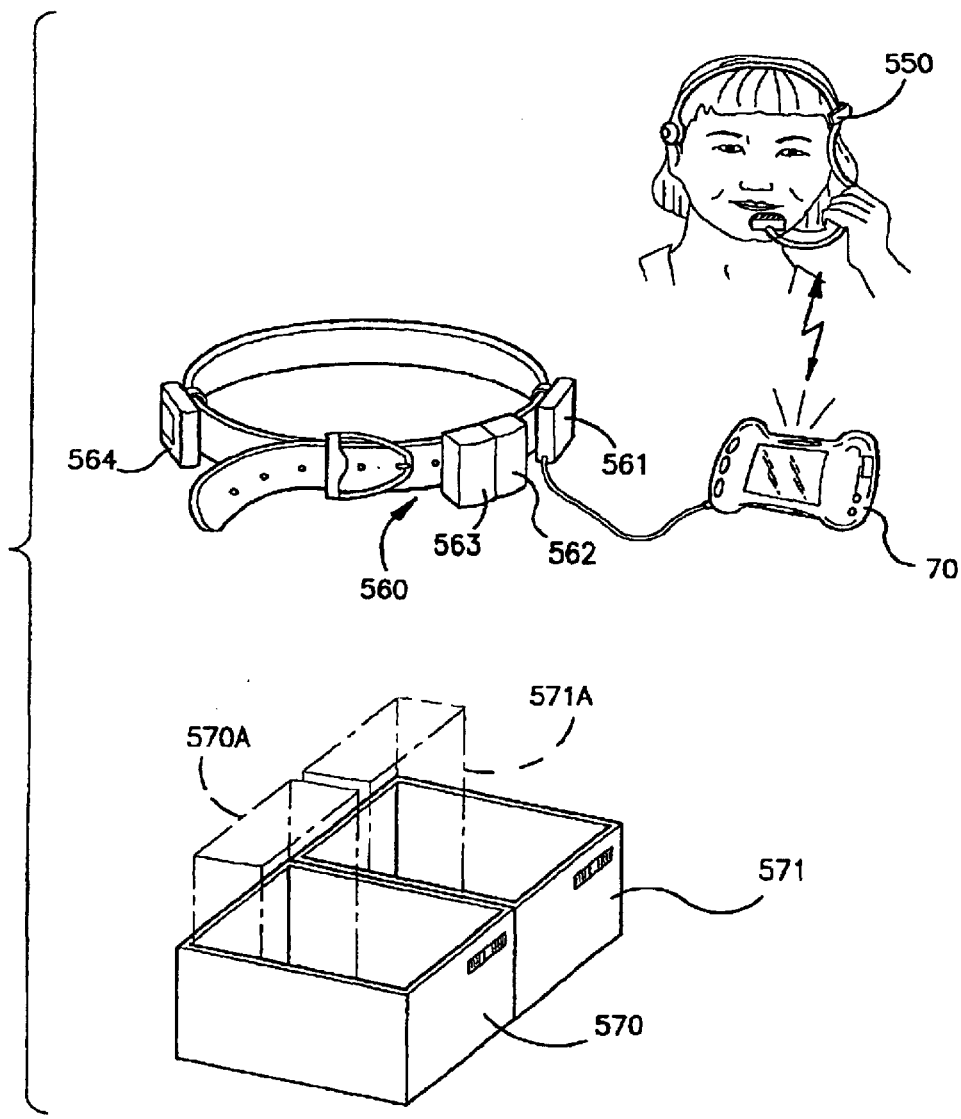
FIG. 12 is an alternative preferred embodiment of a terminal system for use by an attendant in fulfilling customer orders.

FIG. 12 illustrates an alternative preferred embodiment of a system of the present invention which may be employed by an attendant collecting items for delivery to customers. In FIG. 12, a voice headset 550 is shown which uses a narrow band radio for communicating data to and from the portable terminal 70. In the event the attendant uses the terminal for extended time periods, a wearable battery pack 560 may be provided to supplement the battery of the terminal 70. In an alternative preferred embodiment, the terminal could be a wearable design for ease of use by the attendant. Examples of such a wearable design are illustrated in U.S. Pat. Nos. 5,514,861; 5,250,790; 5,543,610; 5,340,972; 5,191,197; 5,410,140; and 5,416,310; all of which are assigned to the assignee of the current invention.

The items collected by the attendant may be placed in the containers 570 and 571. These containers can be supplemented with bags 570A, 571A and are preferably provided with bar coded tags. These tags may be registered by the attendant with the terminal 70 and associated with a specific customer. This permits an attendant to collect items for multiple customers with one pass through a store. Preferably, the attendant scans the selected item, places the item in the bag 571A and then scans the bag label. This assures that the article is placed in the correct bag, and can provide confirmation that a scanned item is bagged for the desired customer.

In the event the attendant uses the system frequently, it will be preferred to provide a bar code scanner which is easy to use and light weight. This can be scheduled by employing a body wearable terminal design such as that illustrated in FIG. 12. The belt 560 could be provided with all the necessary terminal functions through modular packs 561–564. Battery 561 could be supplemented with a CPU component 562, a radio module 562, memory board 563 and audio/video module 564. These systems would communicate with a headset 550, a wrist-mounted display, and a wireless ring scanner. It is preferred that these components employ a wireless communication data line which permits multi-channel communication to the CPU component 562, and that the belt modules be connected using a flexible cable connector data bus.

As a result, a customer's shopping list will be subdivided into a series of lists with related items which a customer may redesignate for its own purposes. Once the attendant has completed the collection process, the attendant prints out customer stickers which are placed on bags used to transport a customer's selected items to the customer's delivery location. The attendant may be provided with a portable printer which is commercially available from Symbol Technologies, Inc.

In order to improve on the efficiency of the delivery system described above, it is preferred that the customer include a delivery time window and location in their delivery requests. These delivery options may correspond to a delivery option program the store has instituted, i.e., same day delivery, same hour delivery. Once these entries are entered into the central host, the central host will order the collection of home delivery orders so as to provide for the delivery to customers located in proximity to each other in both location and delivery time periods. In addition, a customer's shopping list may also be reorganized by the central computer to account for efficient collection of goods for the attendant relevant to current location. Thus, all items in the same aisle will be grouped together for collection by the attendant and once a location within the aisle is identified by the scanning of a current or prior article, the order will be reordered to provide for the ordered selection of goods within the aisle. This dynamic reorganization of items allows for real world situations in which an attendant may be called away for a moment or simply proceeds in an inefficient direction.

The attendant could also be provided with a "bag" link on the portable terminal. Each bag may be provided with a unique coded identifier. Once the attendant begins using the bag for a particular customer's products, the attendant can scan the bag code with the portable terminal using the "plus" key. The bag may be scanned prior to or after the items are inserted into the bag by the attendant. The portable terminal will identify this as a bag containing customer products and automatically associate the bag to the customer. The identification of the bag and contents is stored on the system and may be forwarded to a customer via E-mail or made available with a password protected web page. In a preferred embodiment, these "bags" could be reusable totes electronically matched to a customer identification code, and upon each delivery to the home, totes from the last delivery are retrieved and returned to the store.

Figure 6:
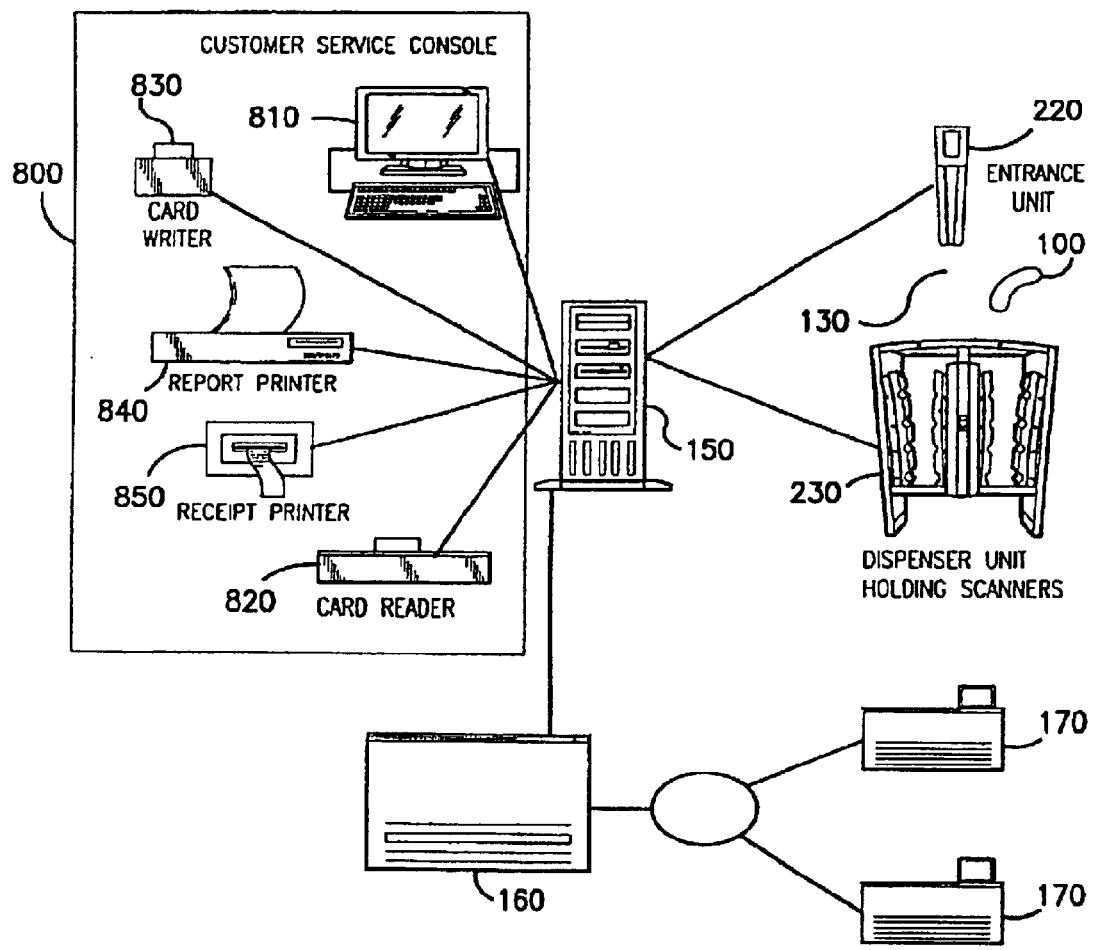
FIG. 6 is an alternative preferred embodiment of a system of the present invention employed in a self-scanning system.

In the event a customer selects the item for collection and pick-up at the store, the customer may proceed to a service desk shown in FIG. 6 to make payment and receive a receipt. The customer desk 800 is provided with a service console 810, a card reader 820 for identifying a customer loyalty card, a report printer for generating report data for the customer, a card writer 830 and a receipt printer 840. The customer may settle his account and proceed to collect his bags of goods.

E. Delivery Tracking

In the event a customer selects a delivery option, in a preferred embodiment of the present invention the delivery attendant is also provided with a portable terminal of the present invention. In addition, regular customers will be provided with machine readable lables at their delivery site.

The delivery site may include a refrigerated storage compartment or simply a storage box. The attendant scans the items delivered and the machine coded destination label. This information is delivered to the central host via a wide area network communication interface. In the event no customer is present to accept the delivery and items are included which are not acceptable for delivery in the assigned receptacle, i.e., frozen items in an unrefrigerated compartment, the portable terminal will notify the attendant not to leave at least those bags including spoilable items in the container, and to immediately communicate a message, by E-mail or telephone, of the failed delivery attempt. In the event the message is received by the customer at their predetermined destination, the attendant may be signaled with the portable terminal to redeliver the items.

This system provides dynamic tracking of goods which can be accessed by the consumer. In the event the consumer wishes to find the status of their order, they can log onto the central host with a networked computer or automated telephone system and receive a notice as to the last known location of the items to be delivered and expected time of delivery.

Figure 13:
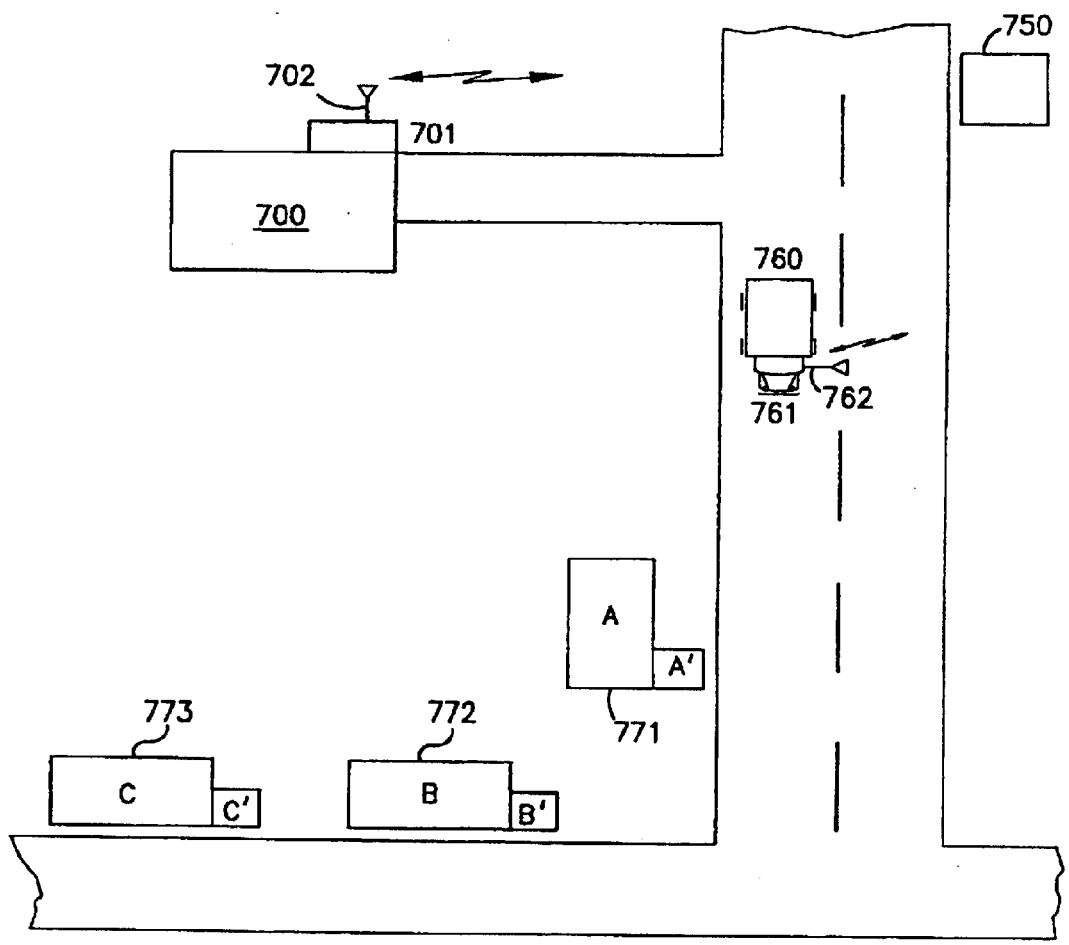
FIG. 13 is a block diagram of a preferred delivery system for an order fulfillment system.

In FIG. 13, a preferred embodiment of a delivery system is illustrated. A truck 7600 is loaded at a warehouse facility 700 with packaged items for delivery to customers A, B and C. The truck is provided with a portable terminal (not shown) and a vehicle mount cradle. In order to supplement the battery life of the portable terminal is provided with a recharging cradle which recharges the battery in the portable terminal when it is not in use. The cradle is also provided with a signal step-up antenna which receives the radio signal generated by the portable terminal and retransmits it to a wide area network access point. This permits a portable terminal employing a wireless radio having limited range to communicate over a wide area network without heavy consumption of battery life.

Figure 14:
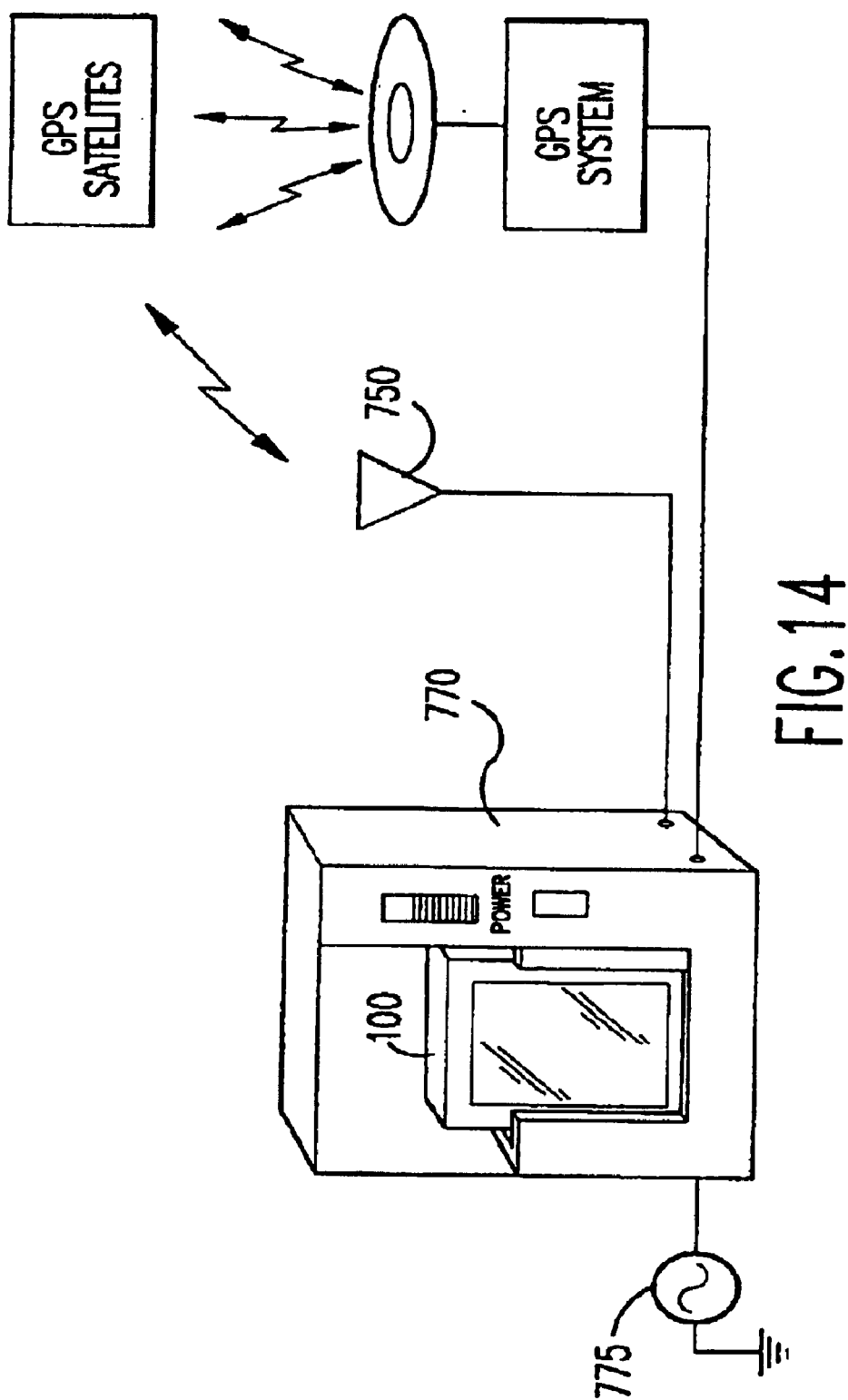
FIG. 14 is a preferred embodiment of a vehicle cradle system for a delivery system of the present invention.
Figure 15:
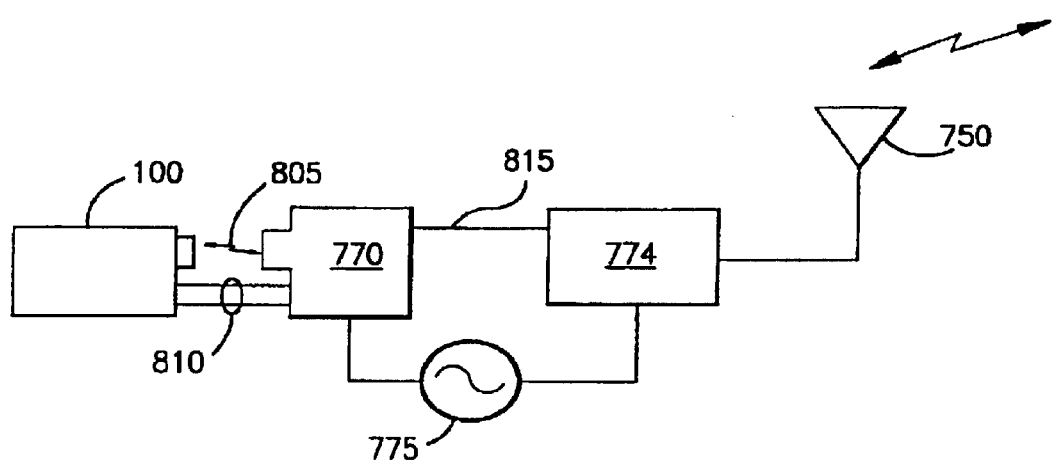
FIG. 15 is a block diagram of the vehicle cradle and terminal system illustrated in FIG. 14.

FIG. 14 illustrates a vehicle cradle 770 connected to a battery source 775. FIG. 15 illustrates a portable terminal 100 in communication with a cradle 770. The systems communicate via a IR connector and have contacts 810 to charge the battery of the portable terminal 100. In addition, the cradle is provided with a signal generator 774 which is coupled to antenna 750. Although not shown, the IR connector 805 could be replaced with a limited range radio transceiver. In the event ground location of the vehicle is desired beyond the identification of the last customer location, the system could be provided with a GPS system as illustrated in FIG. 14. These systems are generally known in the art and will not be explained in detail herein.

The herein described embodiments of the present invention are intended to provide the preferred embodiments of the present invention as currently contemplated by the applicants. It would be obvious to anyone of skill in the relevant art based on the herein described examples without straying from the present invention that numerous modification could be made to the described preferred embodiments. For example, the portable terminal could take any number of forms including wearable solutions available from Symbol Technologies, Inc. and other portable solutions described herein. In addition, the graphical user interface could also be implemented as a number of different presentation schemes. Moreover, although many of the preferred embodiments have been described in the context of a self-scanning supermarket application, the system could be used in any type of self-scanning application. For example, in a clothing store, the portable terminals could be used to provide information pertaining to recommended accessories which would match a selected item by providing cost, location and even a display of how two or more items would appear as one outfit. In addition, even though the remote order entry system has been described in the context of a home computer, it could also be implemented in the form of a selection kiosk or other form of automated graphical selection device such as "WebTV" type devices through the use of a portable device that could be used both in the home to maintain home inventory tracking and in the store. Accordingly, the herein described embodiments are merely exemplary in nature and are not intended to represent every possible embodiment of the present invention.

We claim:

1. A system that fulfills orders placed from a remote computer, said system comprising:
    a communication network for communicating an order from the remote computer to a central order processor, said order including a customer destination location for delivering a completed order;
    a portable terminal having a data communication network connection for retrieving the order from the central order processor;
    a reusable tote electronically matchable to a customer identification code for containment of items included in the order; and
    a vehicle cradle for mounting on a motorized delivery vehicle for delivering goods to the customer destination location, said vehicle cradle including a housing for removably receiving said portable terminal, a power management system for delivering power to said portable terminal and a communication port for communicating data from said vehicle cradle to said portable terminal;
    wherein said portable terminal is operable within said vehicle cradle and at a location remote from said vehicle cradle.

2. The system of claim 1, wherein the vehicle cradle couples to a wide area network antenna for communicating signal to the central order processor.

3. The system of claim 1 wherein the vehicle cradle is coupled to a GPS antenna and location processor for deriving the coordinates of the vehicle.

4. The system of claim 1 the vehicle cradle further comprises:
    an antenna transmitter for transmitting a set of transmission signals received from the portable terminal over the communication port over a wireless wide area communication network.

5. The system of claim 1 the communication port is a wireless communication transceiver.

6. The vehicle cradle of claim 5 wherein the communication port is an infra-red communication transceiver.

7. The system of claim 1, the vehicle cradle comprises:
    a housing configured to allow a user to secure and remove the portable terminal;
    a battery charger for charging a battery within the portable terminal;
    a communication port for receiving order data from the portable terminal, the order data including a customer destination location for a delivery of completed order by the motorized vehicle; and
    a signal transmitter for transmitting the order data received from the portable terminal over a wide area wireless communication network to an order server.

* * * * *